(12) United States Patent
Ota et al.

(10) Patent No.: US 8,305,709 B2
(45) Date of Patent: Nov. 6, 2012

(54) PERPENDICULAR MAGNETIC HEAD AND MAGNETIC RECORDING SYSTEM HAVING NON-MAGNETIC REGION IN SHIELD LAYER

(75) Inventors: Norikazu Ota, Tokyo (JP); Tatsuhiro Nojima, Tokyo (JP); Tsuyoshi Umehara, Tokyo (JP)

(73) Assignee: TDK Corporation, Tokyo (JP)

( * ) Notice: Subject to any disclaimer, the term of this patent is extended or adjusted under 35 U.S.C. 154(b) by 637 days.

(21) Appl. No.: 12/188,706

(22) Filed: Aug. 8, 2008

(65) Prior Publication Data

US 2010/0033879 A1 Feb. 11, 2010

(51) Int. Cl.
*G11B 5/127* (2006.01)
(52) U.S. Cl. .................................. 360/125.16
(58) Field of Classification Search ............ 360/123.01–123.61, 125.01–125.75
See application file for complete search history.

(56) References Cited

U.S. PATENT DOCUMENTS

| | | | |
|---|---|---|---|
| 4,656,546 A | 4/1987 | Mallory | |
| 5,095,397 A * | 3/1992 | Nagata et al. | 360/318 |
| 6,477,008 B1 * | 11/2002 | Chang et al. | 360/128 |
| 6,604,274 B1 | 8/2003 | Sato | |
| 6,646,828 B1 | 11/2003 | Sasaki | |
| 7,126,790 B1 | 10/2006 | Liu et al. | |
| 7,196,871 B2 | 3/2007 | Hsu et al. | |
| 7,268,974 B2 | 9/2007 | Lille | |
| 2001/0043434 A1 * | 11/2001 | Urai et al. | 360/126 |
| 2006/0103977 A1 | 5/2006 | Lee et al. | |

OTHER PUBLICATIONS

Data Clinic Knowledgebase: Data Recovery and Hard Disk reference section > Hard disk drive functionality [online], Retrieved from the Internet Web: http://www.dataclinic.co.uk/data-recovery/hard-disk-functionality.htm [retrieved on Dec. 29, 2011].

* cited by examiner

*Primary Examiner* — Joseph Feild
*Assistant Examiner* — Gustavo Polo
(74) *Attorney, Agent, or Firm* — Posz Law Group, PLC

(57) ABSTRACT

A perpendicular magnetic head for writing information on a magnetic recording medium comprises an ABS, a coil for generating a magnetic flux, a magnetic pole layer, a magnetic shield layer, and a gap layer disposed between the magnetic pole layer and the magnetic shield layer. Further the magnetic head has a non-magnetic region of a non-magnetic material. The non-magnetic region is disposed in the magnetic shield layer and positioned behind the ABS at a predetermined distance. The non-magnetic region is also disposed in the magnetic shield layer and has a predetermined width. With such a configuration, an undesirable concentration of the magnetic flux on the ABS is prevented.

14 Claims, 8 Drawing Sheets

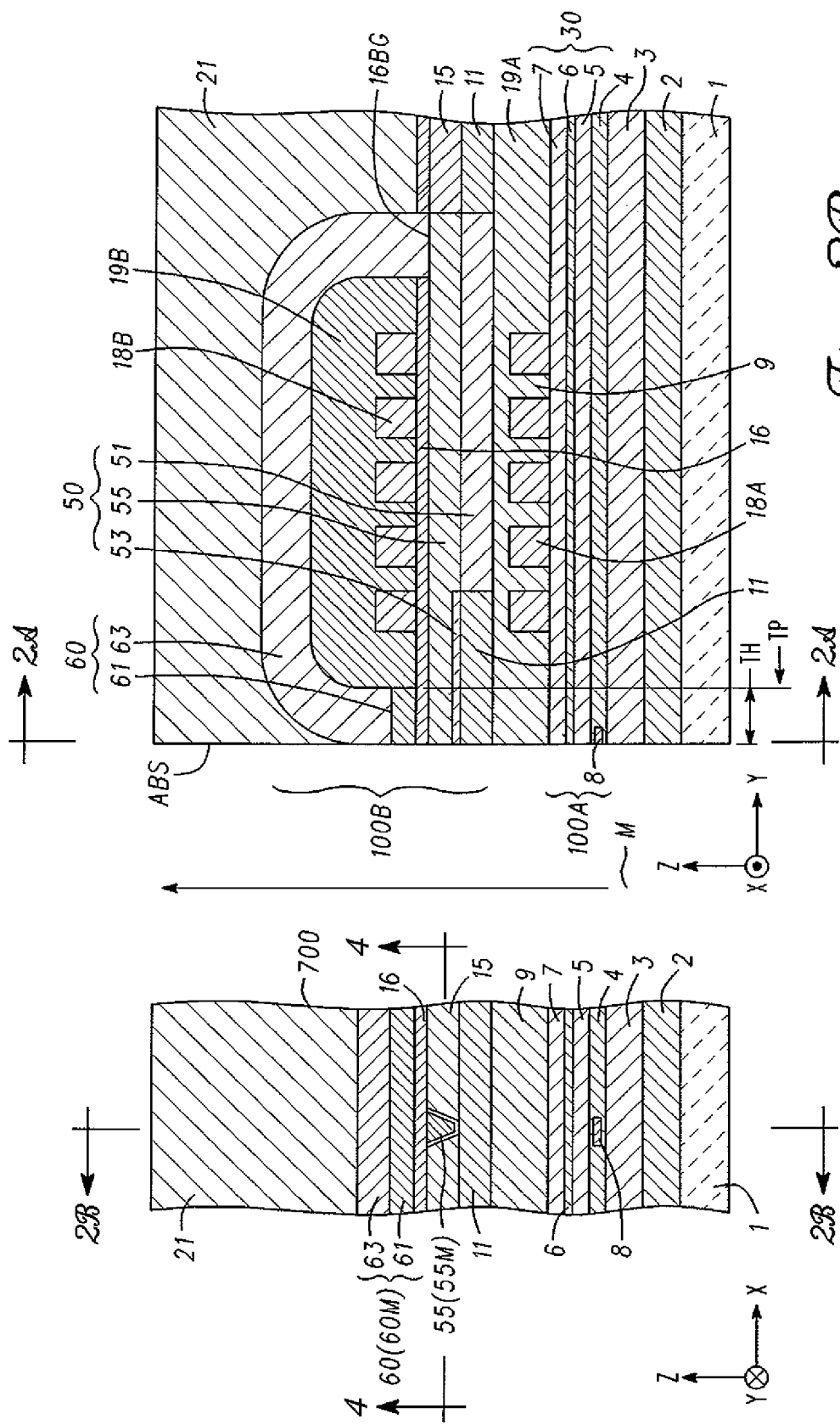

-PRIOR ARTize
PERPENDICULAR MAGNETIC HEAD AND MAGNETIC RECORDING SYSTEM HAVING NON-MAGNETIC REGION IN SHIELD LAYER

TECHNICAL FIELD

The present invention generally relates to recording systems, and particularly to a perpendicular magnetic recording head for performing the recording process of a perpendicular recording system, and a magnetic recording system equipped with a perpendicular magnetic recording head.

BACKGROUND

A thin film magnetic head to be equipped in a magnetic recording system such as a hard disk drive has been widely used in the recent years. In developing the thin film magnetic head, the recording density of a magnetic recording medium such as a hard disk (hereinafter, "recording medium") has been vastly improved. However, further improvement in performance was still required. As a result, the magnetic recording system was changed from a longitudinal recording system to a perpendicular recording system. The perpendicular recording system has the advantages that a high line recording density can be realized, and that the recording medium after recording is unsusceptible to the influence of thermal fluctuation.

The thin film magnetic head of the perpendicular recording system (hereinafter, "magnetic head") is provided with a thin film coil generating a magnetic flux, and a magnetic pole extending rearwardly from an air bearing surface (hereinafter, "ABS"), and conducting the magnetic flux to the recording medium. The magnetic head can magnetize a recording medium by generating a magnetic field (a perpendicular magnetic field) to therefore magnetically record information in the recording medium.

FIG. 1 is a sectional view of a magnetic head 100B' along with a moving direction (+Z-direction) of a recording medium 80'. The recording medium 80' is on the left side in FIG. 1 and the recording head 100B' on the right side. An air bearing surface (ABS) is located on the left edge of the recording head 100B' which faces the recording medium 80'. An arrow line (F') in FIG. 1 represents a pathway of the magnetic flux which a main magnetic pole layer 55' (a portion of a magnetic pole layer) generates. The magnetic flux F' is directed perpendicularly toward the recording medium 80' from the ABS of the main magnetic pole layer 55', penetrates a magnetizing layer 81' of the recording medium 80', advances in a soft magnetic layer 82' of the recording medium 80' toward a moving direction of the recording medium 80' (+Z-direction), and returns in a diffused state to the magnetic shield layer 60' (with a low magnetic flux density). The surface on which the magnetic flux returns is a magnetic shield surface 60M'.

In order to enhance recording density, magnetic distribution and magnetic density by which a transition of bits of recording data becomes clear are required, as well as narrow writing width, with respect to the +Z-direction in FIG. 1. In order to realize the narrow writing width, a strong magnetic field is required even when a width of the main magnetic pole layer 55' is narrow. Additionally, in order to more completely clear the transition of bits, the following two elements are required:

i) the capability to rapidly switch magnetizing conditions (positive and negative) according to the switching action of the magnetic field (a large magnetic gradient); and ii) the capability to sufficiently weaken the returning magnetic flux F' in order not to negatively affect the magnetizing layer 81' that has been recorded as the flux F' returns from the soft magnetic layer 82' to the magnetic shield layer 60'.

When the magnetic field intensity on the ABS of the magnetic shield layer 60' is significantly large, leakage of the magnetic flux to its surroundings also becomes large. Eventually, such magnetic flux leakage affects the recording medium 80' negatively. Therefore, it is necessary to keep the magnetic field intensity for recording as small as possible so that there is no magnetic flux leakage. Especially, in view of a demand of higher density of recording data, when the soft magnetic layer 82' becomes thinner, a magnetic flux in the soft magnetic layer 82' will be easily saturated. As a result, the magnetic flux overflowed from the soft magnetic layer 82' converges around the magnetic shield layer 60' (a bottom edge of the magnetic shield layer 60'). Further, it is also observed that the magnetic flux returns not only at the center but at other areas with a certain distance in the side direction as well. The magnetic flux returned at the sides creates a WATE (Wide Area Track Eraser/Erasing) which is a drawback in erasing written data. It is depicted in FIG. 8 that WATE occurs at lower edges of magnetic field surface 60M on the ABS and at an area having width ($\phi$) from the center line CL in the side direction (X-direction).

What is needed then is a system and structure that prevents a partial concentration of magnetic flux on the magnetic field surface 60M' by diffusing the return flux in a proper way, and especially prevents the occurrence of WATE.

Prior references describing a technology to prevent a magnetic flux concentration are following:

Ref. 1: U.S. Pat. No. 7,268,974
Ref. 2: U.S. Pat. No. 6,646,828

(Ref. 1)

Ref. 1 (U.S. Pat. No. 7,268,974) discloses a notch (notch 106') which is located in the magnetic shield layer 60' and the ABS, further, located on the trailing side from the main magnetic pole layer 55 (see FIG. 7). The notch 106' is filled with non-magnetic material so that the notch 106' functions to block magnetic flux. This configuration weakens a magnetic field on the notch 106', and diffuses the returning magnetic flux in the X-direction. However, the notch 106' filled with non-magnetic material completely blocks the returning magnetic flux. Therefore, the magnetic flux diffused in the X-direction easily concentrates at both edges of the notch 106' (shown as ED in FIG. 7). Accordingly, such a configuration described in Ref. 1 still has a drawback that the returning magnetic flux(s) is intently concentrated and enlarged at the edges of the notch 106'.

(Ref. 2)

Ref 2 (U.S. Pat. No. 6,646,828) discloses a configuration disposing a non-magnetic portion in a pathway of a circulation of a magnetic flux in order to prevent a concentration of the magnetic flux. However, this configuration is directed to a longitudinal magnetic recording head which was previously used. Therefore, the basic configuration differs from that of a perpendicular magnetic recording head to which the present invention is directed. For example, an area of a magnetic pole surface on the ABS is completely different in size from an area of a magnetic shield surface, the magnetic pole surface functioning to emit a magnetic flux, the magnetic shield surface functioning to collect the magnetic flux. In the longitudinal magnetic recording head, the magnetic shield surface is smaller than the magnetic pole surface so that data/information is to be recoded when the magnetic flux is in the returning pathway. On the other hand, in the perpendicular magnetic recording head, magnetic shield surface is 100 times or more as large as the magnetic pole surface so that data/information is to be recorded when the magnetic flux is in the outgoing pathway.

(Other Related References)

Other related references describing technologies for moderating the concentrating flux include:

Ref. 3: US Patent Application Publication No. US 2006/0103977

Ref. 4: U.S. Pat. No. 7,196,871

Ref 5: U.S. Pat. No. 7,126,790

Ref 6: U.S. Pat. No. 4,656,546

Further, in order to moderate the strength of a magnetic flux which is collected on the ABS, it is possible to adapt a material having a low saturation flux density in the magnetic shield layer. However, such a configuration possibly deteriorates magnetic coupling with the magnetic shield layer and the magnetic pole layer. Therefore, it weakens the strength of the circulating flux in the recording head, eventually leading to a weakened magnetic flux intensity for writing/recording. As discussed above, these related references still exhibit two drawbacks. One is the prevention of a partial concentration of magnetic flux on the magnetic shield surface. At the same time, the second is the maintenance of a high magnetic coupling between the magnetic shield layer and the magnetic pole layer.

SUMMARY

To solve the above drawbacks, features of various exemplary embodiments are described below.

(Non-Magnetic Region)

A perpendicular magnetic head for writing information on a magnetic recording medium comprises an air bearing surface (ABS) facing toward the magnetic recording medium; a coil for generating a magnetic flux corresponding to the information to be written on the magnetic recording medium; a magnetic pole layer having a magnetic pole surface disposed at the ABS, the magnetic pole layer permitting the magnetic flux generated by the coil to pass therethrough, and generating a magnetic field for writing the information on the magnetic recording medium; a magnetic shield layer having a magnetic shield surface disposed at the ABS and at a trailing side of the magnetic pole layer, the magnetic shield layer connected to the magnetic pole layer at a backgap displaced from the ABS, the magnetic shield layer collecting the magnetic flux generated by the magnetic pole layer and returning the magnetic flux to the magnetic pole layer; a gap layer made of a non-magnetic material and disposed between the magnetic pole layer and the magnetic shield layer; and a non-magnetic region which is formed of a non-magnetic material and disposed in the magnetic shield layer. The non-magnetic region is positioned behind the ABS at a predetermined distance rearwardly from the ABS. The non-magnetic region has a proper width and depth. Both sides of the non-magnetic region are within sides of the magnetic shield layer.

Thereby, compared with a case where there is no non-magnetic region, a magnetic field density/intensity is reduced on the magnetic shield surface, and on the other hand, a magnetic field density is maintained on the magnetic pole surface at the same level (as a case of no non-magnetic region).

The non-magnetic region is able to be disposed on a connecting line which connects the backgap to the magnetic pole surface in a manner of penetrating the magnetic shield layer to the extent that the above effect is realized. The effect reduces the magnetic field intensity on the magnetic field surface, but maintains the magnetic field intensity on the magnetic pole surface at the same level. Further, the non-magnetic region may be disposed from the ABS with a certain distance, and having a proper width and height.

(Connecting Line)

The "connecting line which connects the backgap to the magnetic pole surface" means a shortest pathway in which the magnetic flux on the ABS (mainly on the magnetic shield layer) runs to the backgap. As shown in FIG. 12, where the backgap 16BG is disposed behind the main magnetic pole layer 55, and symmetrically in view of the center line CL, the connecting line is defined as a vertical line from the center point CL of a trailing edge TE (see FIG. 8). Further, as shown in FIGS. 16 and 17, a center of the backgap 16BG can be positioned off the center line CL by a certain distance, where the connecting line may be defined as a line which connects the center point CP with the center pint BCP of the backgap 16BG. Further, it is also practical to define the connecting line as a minimal line which connects the ABS with a forefront of the backgap 16BG.

(Effects or Advantages of Non-Magnetic Region)

Compared with a case where there is not a non-magnetic region, disposing the non-magnetic region with a proper size in the magnetic shield layer enables the magnetic flux which has a tendency of concentrating on a particular area above the magnetic pole surface (trailing side) to be diffused. As a result, it is also possible to prevent the above WATE drawback.

(Definition of Non-Magnetic Region)

The "non-magnetic region" is a region formed of non-magnetic material, which is mainly disposed in the magnetic shield layer. See, for example, reference numerals 700, 701, and 702 in FIGS. 9, 10, 12, 16, and 17. Materials used for the non-magnetic region have to be non-magnetic, but there is no other specific requirement for the material. Further, the material preferably has an insulating characteristic. For example, aluminum oxide ($Al_2O_3$, hereinafter, "alumina"), SiC, SiO, and NiP are possible materials. The region might be made of the same material of a layer (such as, an overcoat layer) which is disposed on a trailing side (+Z direction) and which is made of non-magnetic material. Or the region might be made of different material from that of surrounding regions. Further, it is possible to configure the non-magnetic region and the overcoat layer as a unit or as different parts. It is also possible to configure the region in a mono-layered structure or plural layered structure. It is not necessary to symmetrically arrange the non-magnetic region from the main magnetic pole layer. It is also possible to dispose the region at the right side or left side to some degree from a center line of the main magnetic pole layer.

(Predetermined Distance of Intervals)

There are no particular limitations with regard to the predetermined distance/interval from the ABS, also the width, depth, and height, or shape, for the non-magnetic region as long as diffusion of the magnetic flux is realized. A rectangular solid shape which is shown in FIGS. 9, 10, and 12 and a cubic shape, or another shape having a rhombic cross-section, are all practical. In addition, a film shape having a large width and a cone shape are also practical for the non-magnetic region. It is also practical to dispose the non-magnetic region or a part of the region at a curved portion of the return yoke layer and to form the non-magnetic region having a curved shape along with the return yoke layer.

(Magnetic Field Intensity on Magnetic Shield Surface Above Magnetic Pole Layer)

The magnetic field intensity on the magnetic shield surface above the magnetic pole layer can be observed/determined where the degree of diffusion of the magnetic flux can be adequately estimated. For example, it may be an area on the ABS at the bottom edge of the magnetic shield layer and 0.2 µm to 2.0 µm from the center of the magnetic pole surface in the right or left direction. FIG. 8 shows one example point WP which is 1 µm (φ) from the center line CL in the X-direction. It is also practical to define the point on the ABS corresponding to a corner by the side and bottom of the non-magnetic region.

(Magnetic Field Intensity of Magnetic Pole Surface)

The intensity of the magnetic field on the magnetic pole surface may be determined at a particular point where the intensity/characteristic of the magnetic flux emitted from the magnetic pole surface is reasonably estimated. For example, a center point CP of the trailing edge ET shown in FIG. 8 can be chosen. The required degree of reducing the magnetic field intensity on the magnetic pole surface is determined to maintain a necessary intensity of the writing magnetic field. For example, the maintained intensity of the magnetic field is around 50% or less than the retention of the recording medium. The required degree of reduction or the required intensity of the magnetic field varies according to the required amount of writing and erasing for a product.

(Penetrating Manner)

The non-magnetic region is disposed in the magnetic shield layer above the magnetic pole layer or the connecting line in the Z-direction. It is preferably practical that the non-magnetic region penetrates the magnetic shield layer. With the configuration, the strength of the magnetic field (or intensity of the magnetic flux) above the magnetic pole field or the connecting line becomes weak to some degree. As the result, the magnetic flux which tends to mostly return to the magnetic shield surface near the trailing side from the magnetic pole layer (or the connecting line) is diffused in the right-left direction (X-direction). Further, the both sides of the non-magnetic region are disposed inside the sides of the magnetic shield layer. Thereby, certain spaces between the non-magnetic region and the magnetic shield layer remain, and the spaces function as pathways of the circulating magnetic flux.

(Width, Height, and Depth)

It is more suitable to design the width of the magnetic shield surface to be 100 times or more as large as the width of the magnetic pole layer. It is also suitable that the width of the non-magnetic region is larger than the width of the backgap. With regard to an alignment of the non-magnetic region, an area suitable for a front end of the non-magnetic region, is behind a boundary (a throat height position) between an internal end of the magnetic shield layer and a front end of the insulating layer around the coil, and in front of a boundary between the backgap and the insulating layer. It is not necessary for the non-magnetic region to exist only within the above area. As long as a large amount of the non-magnetic region exists in the above area, claimed magnetic head is capable of operating even if some parts of the non-magnetic region are present outside the area. Further, the non-magnetic region can be disposed in a parallel area of the magnetic shield layer (an area which is aligned in parallel with the magnetic pole layer in an X-Y dimension as shown in FIG. 9). Other examples of the parallel area are described as areas corresponding to blocks I, II, and IV in FIG. 13.

In FIG. 13, the magnetic shield layer has an upside down cup shape from the ABS (having a top in the Z direction). There are curved portions in the front and back sides. However, there is a flat area of the magnetic shield layer between the two sides. The flat area is the parallel area. In view of manufacturing cost, it is ideal to dispose the non-magnetic in the flat area because it is possible to minimize an eliminating process of the magnetic field for the non-magnetic field, resulting in a reduction of manufacturing cost.

(Representative Width, Depth, and Height)

The non-magnetic region has a representative width which is not smaller than a width of the backgap and not larger than a width of the magnetic shield layer. Also, the non-magnetic region may be disposed behind the throat height and in front of the backgap. Representative specifications of the non-magnetic region are: Width (W7) is within 3 to 20 µm, depth (D7) is within 0.5 to 6 µm, and height (H7) is 0.1 to 5 µm. As shown in FIGS. 9 and 10, where the non-magnetic region has a rectangular shape as a whole, it is possible to define the representative width, height, and depth by width W7, height H7, and depth D7. Further, it is possible to define the representative width, height, and depth based on the connecting line, or a center of gravity of the non-magnetic region.

The non-magnetic region may have a representative width that is 10-100 times as large as a representative depth to the non-magnetic from the ABS. The non-magnetic region may be formed in a material having a saturation magnetic flux density within a range of 1.5 T to 2.4 T.

The non-magnetic region may be disposed on a connecting line which connects the magnetic pole surface with the backgap in the magnetic shield layer in the view of the moving direction of the recording medium. For example, the non-magnetic shield layer penetrates the magnetic shield layer. The non-magnetic region may be symmetrically disposed with respect to the magnetic pole surface, and have a determined width and height.

(Magnetic Recording System)

Another exemplary embodiment is a magnetic recording system comprises a perpendicular magnetic head having the non-magnetic region formed of a non-magnetic material and disposed in the magnetic shield layer; and a recording medium. The recording medium includes a magnetization layer disposed on a side close to the perpendicular magnetic recording head and soft magnetic layer disposed on a side far from the perpendicular magnetic recording head.

(Manufacturing Method)

Another exemplary embodiment is a method for manufacturing a perpendicular thin film magnetic head comprises providing substrate; forming a reading head on the substrate; forming a separating layer on the reading head; and forming a recording head by stacking a magnetic pole layer, the periphery of which is buried with non-magnetic layers, on the separating layers, stacking a gap layer on the magnetic pole layer, stacking a thin film coil on the gap layer, encapsulating the thin film coil within an insulating layer, forming a magnetic filed layer on the insulating layer so as to define a designated fill area, and forming a non-magnetic region with a non-magnetic material for preventing a magnetic flux from partially concentrating on an air bearing surface. It is preferable that the designated fill area has a predetermined width, height, and/or depth to block the concentration of the magnetic flux.

BRIEF DESCRIPTION OF THE DRAWINGS

FIG. 2A is a front elevational view of a magnetic head of the type used in various exemplary embodiments equipped with a perpendicular magnetic recording head;

FIG. 2B is a sectional view of the magnetic head of FIG. 2A equipped with a perpendicular magnetic recording head;

FIG. 11 is without the non-magnetic region; FIG. 12 is without the non-magnetic region;

DETAILED DESCRIPTION

Exemplary embodiments will now be described in detail with reference to the appended drawings. For simplified explanation of the basic structure of the magnetic recording head, a key element, namely the non-magnetic region, is eliminated from FIG. 2A to FIG. 6.

(Thin Film Magnetic Head, Magnetic Head)

First, the configuration of a thin film magnetic head (magnetic head) provided with a perpendicular magnetic recording head according to an exemplary embodiment will be described below.

FIG. 2A is front view on the ABS of the magnetic head, and FIG. 2B is a cross sectional view (Z-Y dimension) perpendicular to the view in FIG. 2A. In the following description, dimensions in the X-, Y-, Z-axis directions shown in FIGS. 2A and 2B are expressed by "width," "depth or length," and "thickness or height," respectively. In the Y-axis direction, the side closest to the ABS and the side farthest therefrom are expressed as "forward" and "rearward" directions respectively. Elements reaching to the ABS and extending from the ABS in the description are referred to as "projected" and "recessed," respectively.

Figure 1:
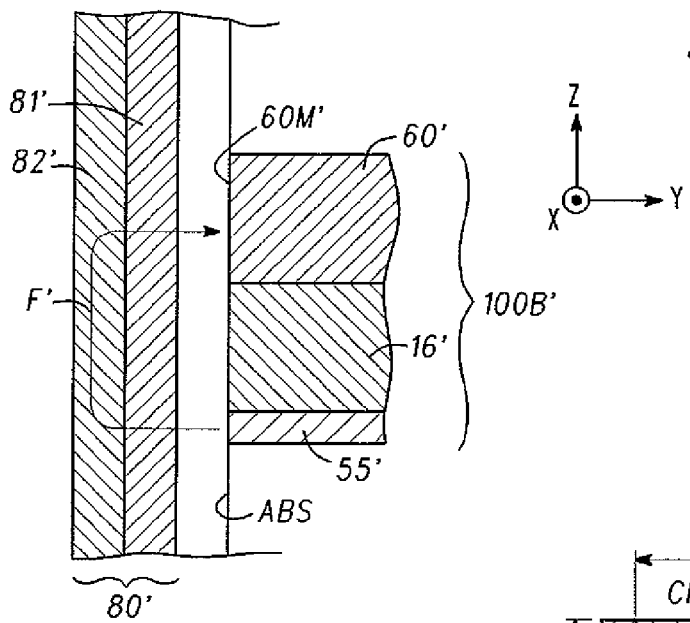
FIG. 1 is a sectional view illustrating a fundamental configuration of a conventional prior art magnetic head.
Figure 4A:
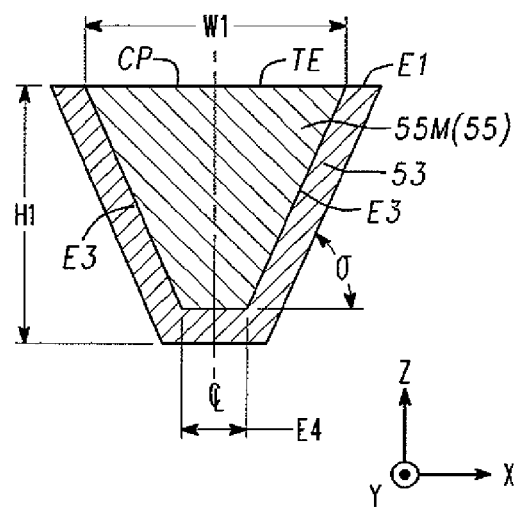
FIG. 4A is a front view showing a plan configuration of the magnetic pole surface/magnetic pole layer on the ABS in FIG. 2A.
Figure 4B:
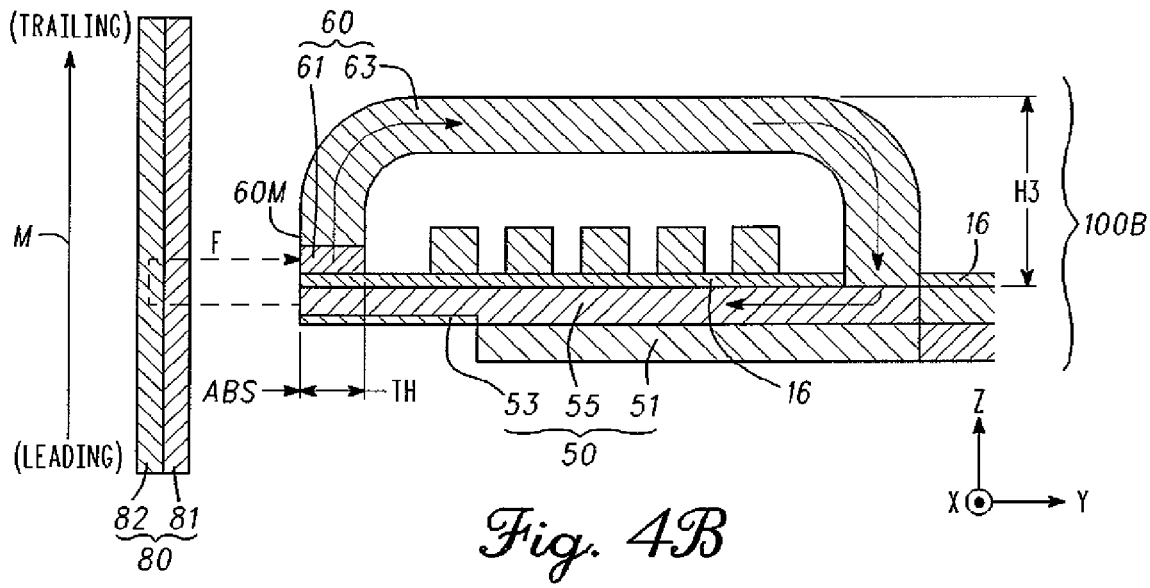
FIG. 4B is a sectional view showing the sectional configuration of a key part of the magnetic recording head and the recording medium shown in FIG. 2B.

When a direction M of the recording medium 80 shown in FIG. 4B is considered as a flow, the "trailing side" means an outflow side, and the trailing side is an upper side in the thickness direction (+Z-axis direction). On the other hand, an inflow side is a "leading side," and the leading side is a bottom side in the thickness direction (−Z-axis direction).

(Magnetic Head)

The magnetic head magnetizes the recording medium 80 shown in FIG. 4B (for example, a hard disk), and is, for example, a composite head which is capable of performing both of recording/writing and reading processes. As shown in FIG. 2B, the magnetic head is composed of a substrate 1, an insulating layer 2, a reading head 100A, a separating layer 9, the recording head 100B, and an overcoat layer 21, all of which are stacked in the above order. Herein, the insulating layer 2 is disposed on the substrate 1. The reading head 100A performs a magneto-resistive (MR) reading process. The recording head 100B performs the recording process of the perpendicular recording system. The substrate 1 is formed of a ceramic material such as aluminum oxide titanium carbonate ($Al_2O_3.TiC$). The insulating layer 2, the separating layer 9, and the over coat layer 21 are formed of a non-magnetic insulating material such as alumina.

(Reading Head)

The reading head 100A is composed of a lower lead shield layer 3, a shield gap film 4, and an upper lead shield layer 30, all of which are stacked in this order. A reading element (MR element 8) is buried in the shield gap film 4 so as to be exposed to the ABS opposed to the recording medium 80. The ABS can be defined uniquely by employing, as a reference, one end of the substrate 1 (the left end as viewed in FIG. 2B), supporting a series of components, from the insulating layer 2 to the overcoat layer 21. That is, the ABS is a surface including one end of the substrate 1.

(Lead Shield Layers)

The lower lead shield layer 3 and the upper lead shield layer 30 magnetically separate the MR element 8 from its surroundings, and extend rearward from the ABS. For example, the lower lead shield layer 3 is formed of a magnetic material such as nickel ferroalloy (NiFe, e.g., 80 weight % of nickel and 20 weight % of iron, hereinafter referred to as "Permalloy (trade name)"). The upper lead shield layer 30 is, for example, composed of two upper lead shield layer portions 5 and 7, which are stacked with a non-magnetic layer 6 interposed therebetween. Each of the upper lead shield layer portions 5 and 7 is, for example, formed of a magnetic material such as "Permalloy." The non-magnetic layer 6 is formed of a non-magnetic material such as ruthenium (Ru) or alumina. The upper lead shield layer 30 is not necessarily required to have a stacked/layered structure, and it may have a single-layer structure.

(Shield Gap Layer)

The shield gap layer 4 electrically separates the MR element 8 from its surroundings, and is formed of a non-magnetic insulating material such as alumina. The MR element 8 utilizes a giant magneto-resistive (GMR) effect or a tunneling magneto-resistive (TMR) effect.

(Recording Head)

The recording head 100B is a perpendicular magnetic recording head, or shield type head, which is composed of a magnetic pole layer 50 whose periphery is filled with non-magnetic layers 11 and 15, a gap layer 16 provided with an opening for magnetic joining/connection (a back gap 16 BG), a thin film coil 18B embedded in a insulating layer 19B, and a magnetic shield layer 60, all of which are stacked in the order above.

(Magnetic Pole Layer)

The magnetic pole layer 50 generates a magnetic field and conducts a magnetic flux by the magnetic field to the recording medium 80. The shape of the magnetic pole layer 50 extends rearwardly from the ABS. The magnetic pole layer 50 is composed of an auxiliary magnetic pole layer 51, non-magnetic layer 53, and main magnetic pole layer 55, further all of which are stacked in the above order.

(Auxiliary Magnetic Pole Layer)

Figure 3:
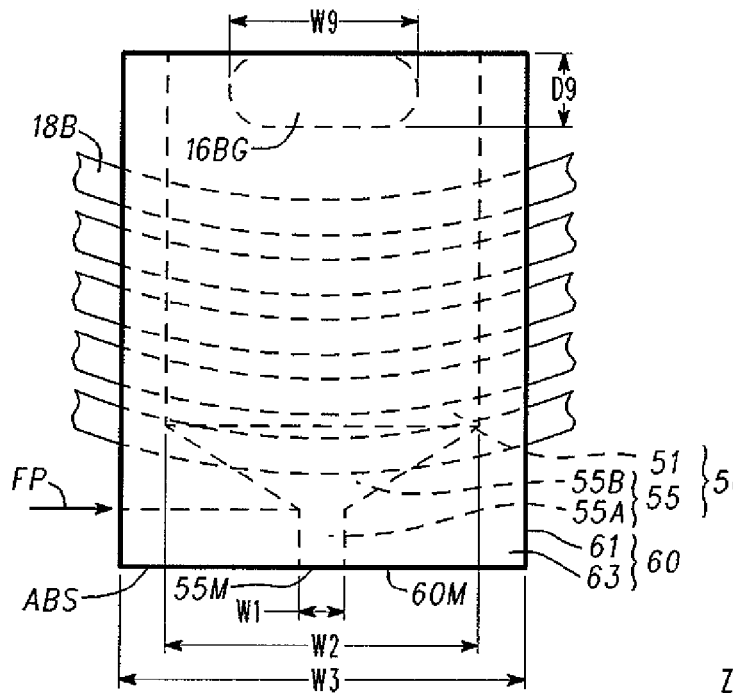
FIG. 3 is a top view showing a plan configuration of key parts of the magnetic head shown in FIGS. 2A and 2B in enlarged dimension.

The auxiliary magnetic pole layer 51 accommodates the magnetic flux and, for example, extends from a portion recessed from the ABS to the back gap 16BG. The auxiliary magnetic pole layer 51 is disposed on the leading side with respect to the main magnetic pole layer 55, and has a rectangular shape (a width W2) as shown in FIG. 3. The non-magnetic layer 11 electrically and magnetically separates the auxiliary magnetic pole layer 51 from its surroundings. For example, the non-magnetic layer 11 is formed of a non-magnetic insulating material such as alumina. Also, the auxiliary magnetic pole layer 51 may be disposed on the trailing side with respect to the main magnetic pole layer 55. With the configuration, the non-magnetic layer 11 electrically and magnetically separates the main magnetic pole layer 55 from its surroundings.

(First Non-Magnetic Layer)

As shown in FIG. 2A, the non-magnetic layer 53 is a first non-magnetic layer that electrically and magnetically separates the main magnetic pole layer 55 from its surroundings. The non-magnetic layer 53 extends from the ABS to the foremost end (Y-axis) of the auxiliary magnetic pole layer 51, and is formed of a non-magnetic insulating material such as alumina or aluminum nitride. The range of extension of the non-magnetic layer 53 can be set arbitrarily. The cross section of the non-magnetic layer 53 parallel to the ABS is U-shaped, as shown in FIGS. 2A and 4A. The main magnetic pole layer 55 fills inside of the non-magnetic layer 53. The non-magnetic layer 53 is formed, for example, by an Atomic Layer Deposition (ALD) method, and has a uniform thickness along the surroundings of the main magnetic pole layer 55 (its bottom and both sides). With respect to the configuration of the non-magnetic layer 53 and the ALD method, the entire disclosures of U.S. patent application Ser. No. 11/708,609, corresponding to Japanese Patent Application JP 2006-316149, and U.S. Pat. No. 6,759,081 are expressly incorporated herein by reference.

(Second Non-Magnetic Layer)

The non-magnetic layer 15 is a second non-magnetic layer which electrically and magnetically separates the main magnetic pole layer 55 from its surroundings. The main magnetic pole layer 55 is embedded inside the non-magnetic layer 53, which has a U-shaped cross-section. On the contrary, the non-magnetic layer 15 is present outside the non-magnetic layer 53 and is formed of a non-magnetic insulating material such as alumina.

Although the non-magnetic layers 53 and 15 are formed of a non-magnetic insulating material, they have different compositions from each other because they are formed by different methods. That is, the non-magnetic layer 15 is formed by a sputtering method using an inert gas, and hence contains the inert gas. For example, the inert gas may be argon (Ar), krypton (Kr), or xenon (Xe). In contrast, the non-magnetic layer 53 is formed by an ALD method using no inert gas, and hence contains no inert gas. It is possible to determine whether the non-magnetic layers 53 and 15 contain any inert gas or not by using a component analysis method such as scanning transmission electron microscopy (STEM) or energy-dispersive X-ray spectroscopy (EDS).

The non-magnetic layers 53 and 15 have different amounts of a specific component due to the above-mentioned different forming methods. That is, the ALD method uses, for example, water and/or trimethyl aluminium (TMA), whereas the sputtering method does not use water or TMA. Therefore, the content of hydrogen (H) in the non-magnetic layer 53 is larger than that in the non-magnetic layer 15.

(Main Magnetic Pole Layer)

The main magnetic pole layer 55 is a main releasing part of a magnetic flux and extends, for example, from the ABS to the back gap 16BG. As shown in FIG. 3, the main magnetic pole layer 55 has a plan shape of substantially a battledore type (HAGOITA-GATA in Japanese) as a whole, and includes, in sequence from the ABS, a front end portion 55A extending rearward from the ABS, and a rear end portion 55B connected to the rear of the front end portion 55A. The front end portion 55A is substantially the releasing part of magnetic flux (magnetic pole), and has a regular unique width W1 defining a recording track width. The rear end portion 55B is a portion for supplying magnetic flux to the front end portion 55A, and has a width W2 which is larger than the width W1. For example, the width of the rear end portion 55B gradually tapers as it approaches the front end portion 55A. The position where the main magnetic pole layer 55 starts to increase in width from the width W1 to the width W2 is a so-called flare point FP. A surface of the main magnetic pole layer 55 functions to emit magnetic flux, and is defined as magnetic pole surface 55M.

As shown in FIG. 4A, the magnetic pole surface 55M of the main magnetic pole layer 55 on the ABS is of a reverse trapezoidal shape (a height H1), whose upper edge is a longer side locating on the trailing side and whose lower edge is a shorter side locating on the leading side. Specifically, the magnetic pole surface 55M has a shape defined by an upper edge E1 (the width W1) located on the trailing side, a lower edge E2 (the width W4) located on the leading side, and two side edges E3. The width W4 is smaller than the width W1. The upper edge E1 is substantially the recording portion in the main magnetic pole layer 55, and the width W1 is about 0.2 μm or less. Bevel angles θ of the magnetic pole surface 55M (the angle formed between the direction of extension of the lower edge E2 and the side edge 3E) can be set arbitrarily, for example, within a range of 90 degrees. As shown in FIG. 4A, the upper edge E1 of the main magnetic pole layer 55, which functions as the recording portion, is a trailing edge TE. The width W1 is a trailing edge width.

(Gap Layer)

As shown in FIGS. 2A and 2B, the gap layer 16 is a gap for magnetically separating the magnetic pole layer 50 and the magnetic shield layer 60, and is formed of a non-magnetic insulating material such as alumina, or a non-magnetic conductive material such as ruthenium.

(Thin Film Coils)

Thin film coils 18A and 18B (or simply coils 18A and 18B) generate a magnetic flux, and are formed of a non-magnetic insulating material such as copper (Cu). The coil 18B has a winding structure (a spiral structure) wound around the back gap 16GB, as shown in FIGS. 2B and 3, and is disposed above the gap layer 16.

Similar to the coil 18B, the coil 18A also has a winding structure. The coil 18A is disposed between the main magnetic pole layer 55 of the magnetic recording head 100B and MR element 8 of the reading head 100A. Current in coil 18A runs in an opposite direction to a current in the coil 18B so that the coil 18A generates a magnetic field which has an opposite direction to a magnetic field generated by the coil 18B. As a result, these two magnetic fields negate the effects of each other so that the coil 18A prevents the magnetic field by the coil 18B from leaking to the surrounding of MR element 8.

(Insulating Layer)

The insulting layer 19B electrically separates the coil 18B from its surroundings, and is formed of a non-magnetic insulating material such as photoresist or spin on glass (SOG), each exhibiting flowability during heating. The foremost end position of the insulating layer 19B is a throat height zero position TP. The distance between the throat height zero position TP and the ABS is a throat height TH. The throat height TH and the throat height zero point TP are shown in FIG. 2B. The insulting layer 19A electrically separates the coil 18A from its surroundings, and is formed of a non-magnetic insulating material in the same matter as the insulating layer 19B.

(Magnetic Shield Layer)

The magnetic shield layer 60 increases the gradient of a perpendicular magnetic field by incorporating the spreading component of magnetic flux before recording (a magnetic flux to be released from the magnetic pole layer 50 to the recording medium 80), and also circulates the magnetic flux between the recording head part 100B and the recording medium 80 by incorporating a magnetic flux after recording (a magnetic flux returning from the recording medium 80 to the thin film magnetic head). The magnetic shield layer 60 extends rearwardly from the ABS on the trailing side of the magnetic pole layer 50, so that the magnetic shield layer 60 can be separated from the magnetic pole layer 50 by the gap layer 16 in the front, and the magnetic shield layer 60 is connected to the magnetic pole layer 50 through the back gap 16BG in the rear. The magnetic shield layer 60 includes, for example, a write shield layer 61 and a return yoke layer 63 which are separated from each other and have different shapes. The write shield layer 61 is positioned at a lower side (the leading side), and the return yoke 63 is positioned at an upper side (the trailing side). As shown in FIG. 2A and FIG. 3, a magnetic shield surface 60M of the magnetic shield layer 60 on the ABS is, for example, a rectangular shape having a width W3 larger than the width W1.

(Write Shield Layer)

The write shield layer 61 functions primarily to increase the gradient of a perpendicular magnetic field, and is formed of a high-saturation magnetic flux density material such as ferroalloy. In particular, by incorporating the spreading component of magnetic flux released from the magnetic pole layer 50, the write shield layer 61 functions (i) to increase the magnetic field gradient of a perpendicular magnetic field; (ii) to narrow the recording width; and (iii) to incorporate an oblique magnetic field component into the perpendicular magnetic field. Like the return yoke layer 63, the write shield layer 61 may function to circulate a magnetic flux in some cases. For example, as shown in FIG. 2B, the write shield layer 61 extends rearward from the ABS, while being adjacent to the gap layer 16. The write shield layer 61 is adjacent to the insulating layer 19 in the rear end thereof. In the embodiment, the write shield layer 61 defines the foremost end position of the insulating layer 19 (the throat height zero position TP). Alternatively, the throat height TH can be defined as a area facing to the magnetic pole layer 50 at the leading edge side of the write shield layer 61 (otherwise, a depth from the ABS).

(Return Yoke Layer)

The return yoke layer 63 functions to circulate a magnetic flux, and is formed of the same magnetic material as the write shield layer 61, for example. As shown in FIG. 2B, the return yoke layer 63 extends from the ABS and above the insulating layer 19 to the back gap 16BG on the trailing side of the write shield layer 61, so that the return yoke layer 63 can be connected to the write shield layer 61 in the front, and connected to the magnetic pole layer 50 through the back gap 16BG in the rear.

(Overcoat Layer)

An overcoat layer 21 protects the thin film magnetic head, and is formed of a non-magnetic insulating material such as alumina.

(Recording Medium)

Referring to FIG. 4B, the recording medium 80 includes, for example, a magnetizing layer 81 and a soft magnetic layer 82 which are disposed on one side close to, and the other side far from, the thin film magnetic head, respectively. The magnetizing layer 81 is one in which information can be recorded magnetically. The soft magnetic layer 82 functions as a pass of a magnetic flux (a so-called flux pass) in the recording medium 80. This type of the recording medium 80 is generally referred to as two-layer recording medium for perpendicular recording. Of course, the recording medium 80 may include a different layer in addition to the above-mentioned magnetizing layer 81 and the soft magnetic layer 82. Practically, the distance between the recording medium 80 and the ABS can be set from around 10 to 20 nm.

(Backgap)

The backgap 16GB, as discussed above, is disposed rearward from the ABS and is a connection of the magnetic pole layer 50 and the magnetic shield layer 60. FIG. 3 shows its depth D9 and width W9. The backgap 16BG is symmetrically disposed with respect to the center line CL of the main magnetic pole layer 55 in the X-direction (see FIG. 10).

(Operation of Thin Film Magnetic Head)

The operation of the thin film magnetic head will be described with reference to FIG. 5. When a current flows from an external circuit (not shown) to the thin film coil 18B of the recording head 100B as information is recorded, a magnetic flux F for recording is generated (simultaneously, a current flows in the coil 18A also). As shown in FIG. 4B, the magnetic flux F is accommodated in the auxiliary magnetic pole layer 51 and the main magnetic pole layer 55 in the magnetic pole layer 50, and then flows to the front end portion 55A (see FIG. 4A). At this time, the magnetic flux F is narrowed at the flare point FP, thereby being focused and enhanced, then the magnetic flux F is released to the outside thereby to generate a perpendicular magnetic field, the magnetizing layer 81 can be magnetized by the perpendicular magnetic field, thus enabling information to be recorded magnetically in the recording medium 80.

The magnetic flux F released from the magnetic pole layer 50 to the recording medium 80 magnetizes the magnetizing layer 81 and is then incorporated through the soft magnetic layer 82 to the write shield layer 61. At this time, a part of the magnetic flux F can also be incorporated into the return yoke layer 63. The magnetic flux F incorporated into the write shield layer 61 and the return yoke layer 63 moves toward the backgap 16GB (as shown arrows in the return yoke 63 in FIG. 4B), then is resupplied to the magnetic pole layer 50. This configures a magnetic circuit because the magnetic flux F circulates between the recording head 100B and the recording medium 80. Most magnetic flux F is returned by the write shield layer 61 and the return yoke layer 63 because of a write shield type configuration. However, the rest of the magnetic flux is returned at some part of the leading edge side (the reading head 100A).

(Reading/Reproducing Information)

Next, the method of reading/reproducing information from the recording medium 80 will be discussed. At the time of reproducing information, when a sense current flows to the MR element 8 of the reading head part 100A, the resistance value of the MR element 8 changes in response to a signal magnetic field for reproduction from the recording medium 80. By detecting the resistance change as a voltage change, the information recorded in the recording medium 80 can be reproduced magnetically.

(Magnetic Recording System)

The configuration of a magnetic recording system equipped with the perpendicular magnetic recording head of the present invention will be described below. FIG. 5 shows the configuration of the magnetic recording system. FIG. 6 shows in enlarged dimension the perspective configuration of a key part thereof. This magnetic recording system is equipped with the above-mentioned thin film magnetic head in, for example, a hard disk drive.

Figure 5:
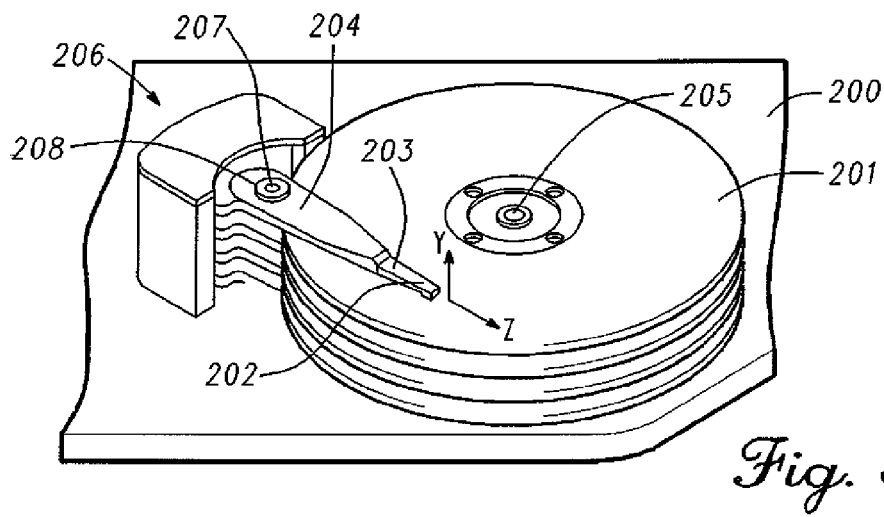
FIG. 5 is a perspective view showing the perspective configuration of a magnetic recording system equipped with a magnetic head of the type used in various exemplary embodiments.
Figure 6:
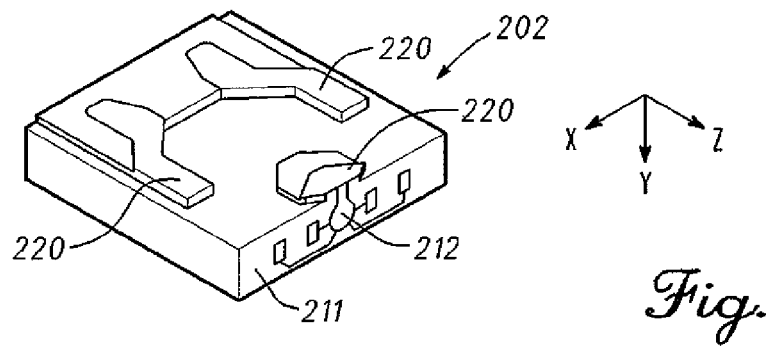
FIG. 6 is a perspective view showing in enlarged dimension the perspective configuration of key parts of the magnetic recording system shown in FIG. 5.
Figure 7:
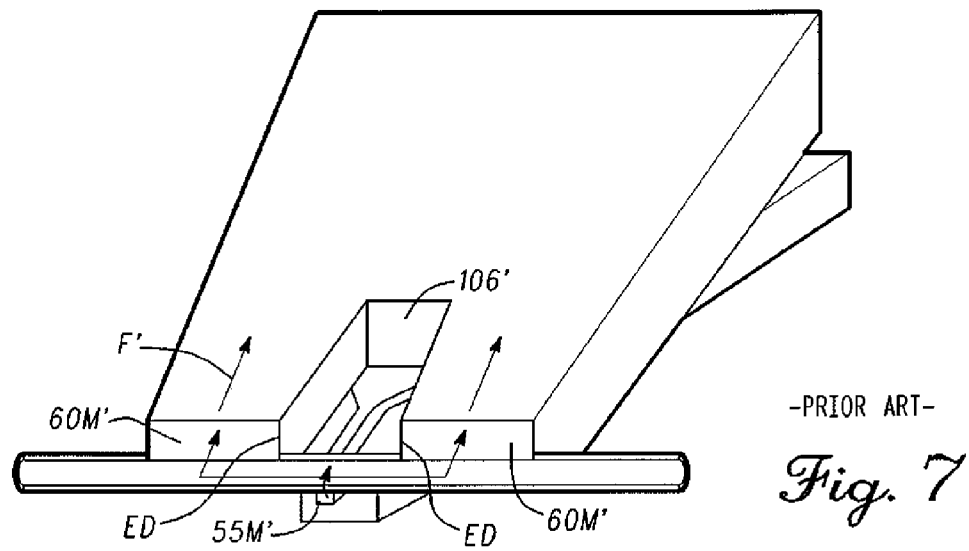
FIG. 7 is a schematic view of a prior art magnetic head having a non-magnetic region on the ABS.

As shown in FIG. 5, for example, this magnetic recording system has, in the inside of a casing 200, a plurality of magnetic disks (for example, hard disks) 201 corresponding to the recording medium 80, in which information can be magnetically recorded (refer to FIG. 4), a plurality of suspensions 203 each supporting on one end portion thereof a magnetic head slider 202, and a plurality of arms 204 each supporting the other end portion of each of the suspensions 203. The magnetic disks 201 are rotatable around a spindle motor 205 fixed to the casing 200. The arms 204 are connected to a driving part 206 as a power source, and are revolvable through a bearing 208 around a fixed shaft 207 fixed to the casing 200. For example, the driving part 206 can be constructed by including a driving source such as a voice coil motor. This magnetic recording system is, for example, a model where the plurality of arms 204 is integrally revolvable around the fixed shaft 207. FIG. 5 shows with the casing 200 partially broken away to expose the internal structure of the magnetic recording system.

(Magnetic Head Slider)

As shown in FIG. 6, the magnetic head slider 202 includes a thin film magnetic head 212 for performing both a recording process and a reading process. The magnetic head slider 202 is mounted on a surface of a substrate 211 having a substantially rectangular solid structure formed of a non-magnetic insulating material such as aluminium oxide titanium carbonate ($Al_2O_3.TiC$). For example, the substrate 211 has one surface 220 (the ABS) provided with an irregular structure for reducing air resistance generated when the arms 204 are revolved, and a thin film magnetic head 212 mounted on the surface orthogonal to the surface 220. The thin film magnetic head 212 has the above-described configuration. When the magnetic disks 201 are rotated during the recording or reproducing of information, the magnetic head slider 202 can be floated from the recording surface of the magnetic disks 201 by using the air flow generated between the recording surface of the magnetic disks 201 (the surface opposed to the magnetic head slider 202) and the air bearing surface 220. FIG. 6 shows the state shown in FIG. 5 upside down to expose the configuration on the surface 220 (the ABS side) of the magnetic head slider 202.

In this magnetic recording system, the magnetic head slider 202 can be shifted to a predetermined region (a recording region) of the magnetic disks 201, by the rotation of the arm 204 during the recording or reproducing of information. When energized, the thin film magnetic head 212 opposes the magnetic disk 201, and can be operated based on the above-mentioned principle of operation, so that the thin film magnetic head 212 performs a recording process or a reading process using the magnetic disks 201. The magnetic recording system employs the thin film magnetic head 212 including the non-magnetic region 700 so that the system can prevent the magnetic flux from partially concentrating on the magnetic shield surface 60M.

(Method of Manufacturing Thin Film Magnetic Head)

A method of manufacturing a thin film magnetic head will next be described. First of all, the outline of the manufacturing process of the entire thin film magnetic head is described with reference to FIGS. 2A and 2B. A more detailed method of manufacturing the perpendicular type magnetic head will be described with reference to FIGS. 2A through 6. Since the materials, dimensions, and structures of a series of components constituting the thin film magnetic head have already been described in detail, the descriptions corresponding to these will be omitted in the following. Since a method of forming a magnetic layer pattern is applied to a method of manufacturing a perpendicular magnetic recording head as an example, the method of forming a magnetic layer pattern will be described as well.

The thin film magnetic head can primarily be manufactured by stacking in sequence a series of components by using any of the existing thin film processes such as a film forming technique represented by a plating method or a sputtering method; a patterning technique represented by a photolithography method; an etching technique represented by a dry etching method or a wet etching technique; and a polishing technique represented by chemical mechanical polishing (CMP). That is, when manufacturing the thin film magnetic head, as shown in FIGS. 2A and 2B, a reading head part 100A is firstly formed by forming an insulating layer 2 on a substrate 1, and then stacking a lower lead shield layer 3, a shield gap film 4 with the MR element 8 buried therein, and an upper lead shield layer 30 (upper lead shield layer portions 5 and 7, and a non-magnetic layer 6) respectively on the insulating layer 2. Subsequently, a recording head part 100B is formed.

Continuously, a separating layer 9 which includes the thin coil 18A is formed on the reading head 100A. Then, elements are stacked in the following order on the separating layer 9: the magnetic pole layer 50 (an auxiliary magnetic pole layer 51, a non-magnetic layer 53, and the main magnetic pole layer 55); the periphery of which is buried with non-magnetic layers 11 and 15; and gap layer 16; the thin film coil 18B buried with an insulating layer 19B; and the magnetic shield layer 60 (a write shield layer 61 and a return yoke layer 63). The thin film magnetic head can be completed by forming the overcoat layer 21 on the recording head part 100B by using an ABS process, a mechanical process and a polishing process.

(Non-Magnetic Region)

Figure 8:
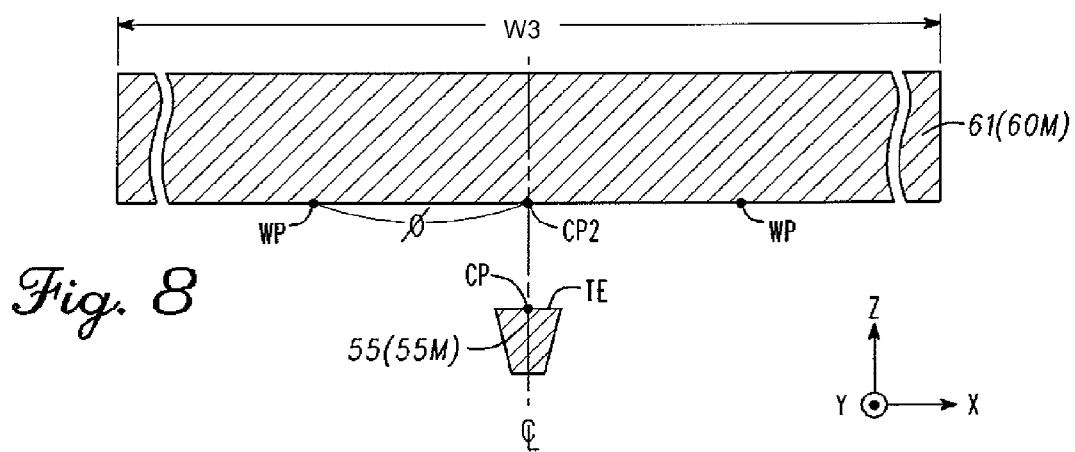
FIG. 8 shows a front view illustrating a magnetic pole layer and a surface, also the write shield layer as a part of the magnetic shield layer and the surface on the ABS as shown in FIG. 2A.
Figure 9:
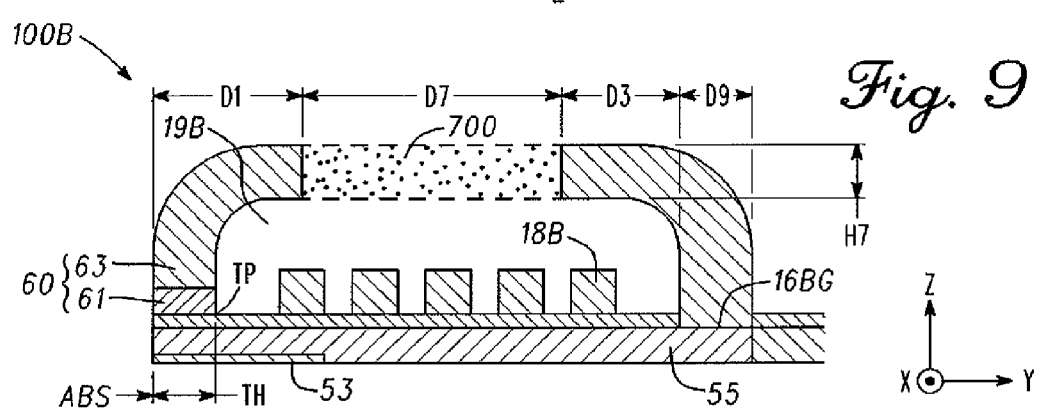
FIG. 9 is a sectional view showing the sectional configuration of the magnetic recording head having a non-magnetic region of FIG. 4B.
Figure 10:
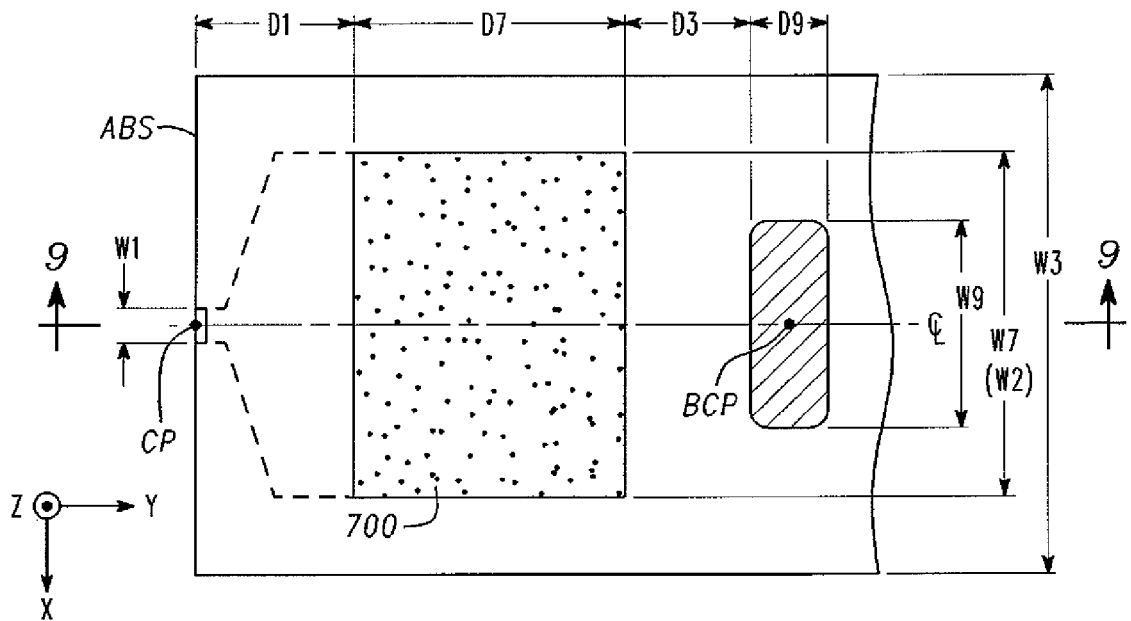
FIG. 10 is a top view showing the plan configuration of the magnetic recording head having the non-magnetic region of FIG. 3.
Figure 12:
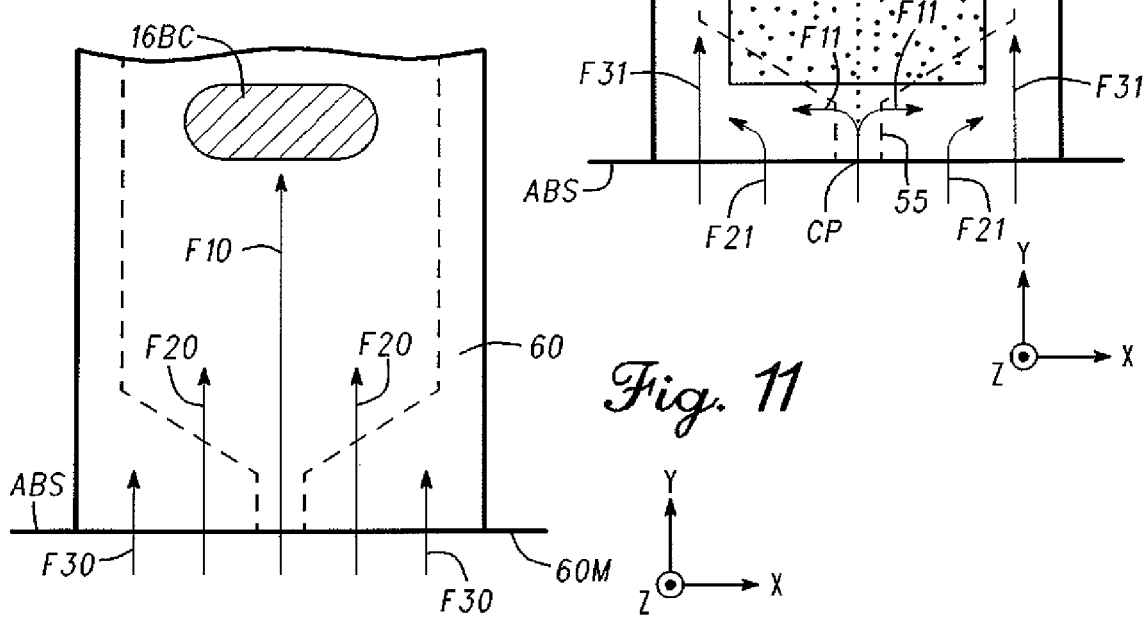
FIGS. 11 and 12 are top views showing the plan configuration of the magnetic recording head of FIG. 3 illustrating flows of magnetic flux.
Figure 11:
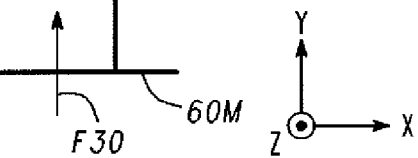
Figure 13:
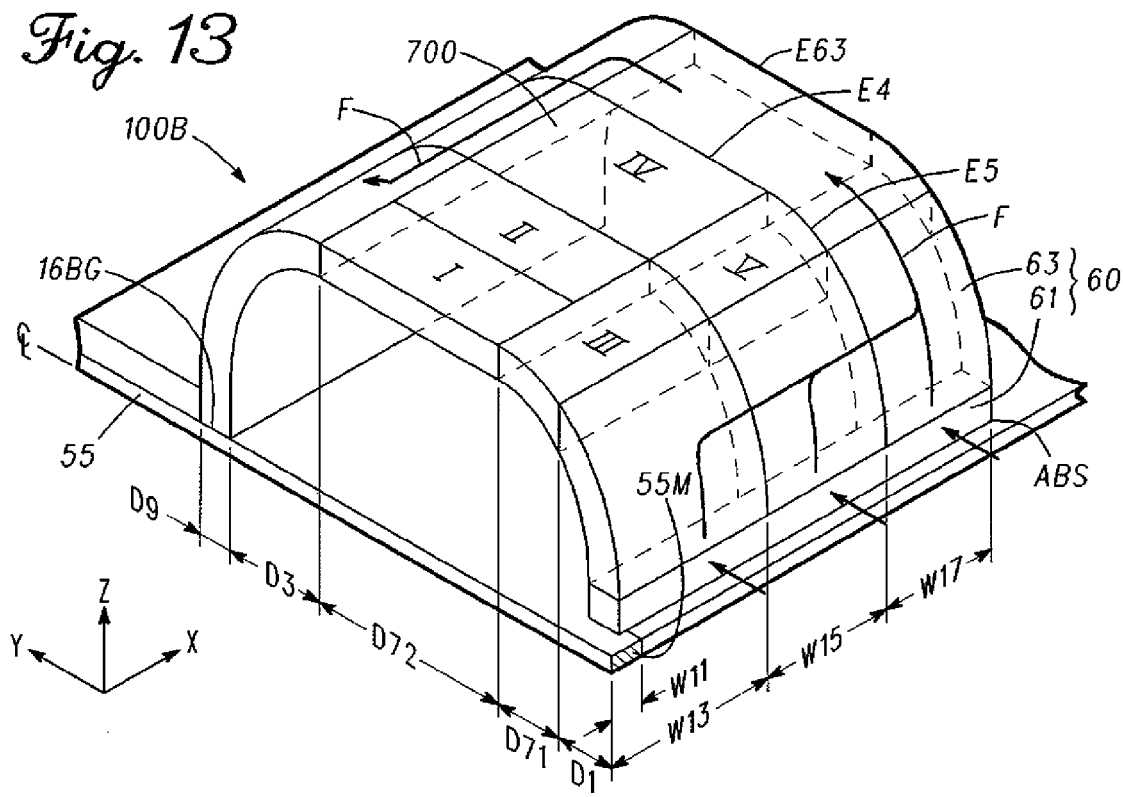
FIG. 13 is a perspective view of a magnetic writing head according to an exemplary embodiment.
Figure 14:
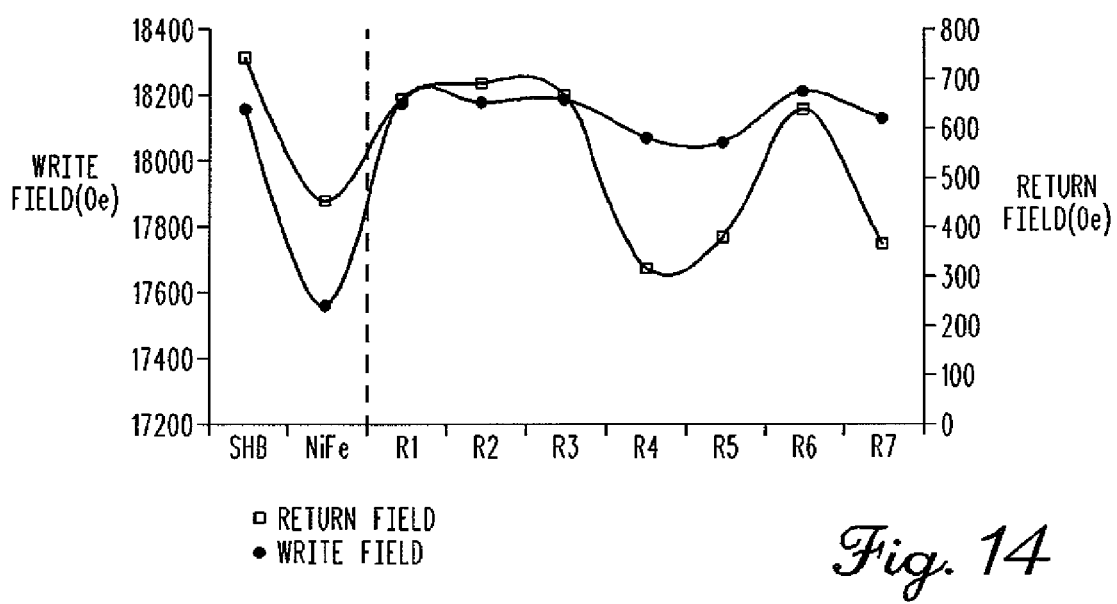
FIG. 14 is a graph of sample data of a conventional magnetic head vs. data from a magnetic head according to exemplary embodiments of writing field/return field.
Figure 15:
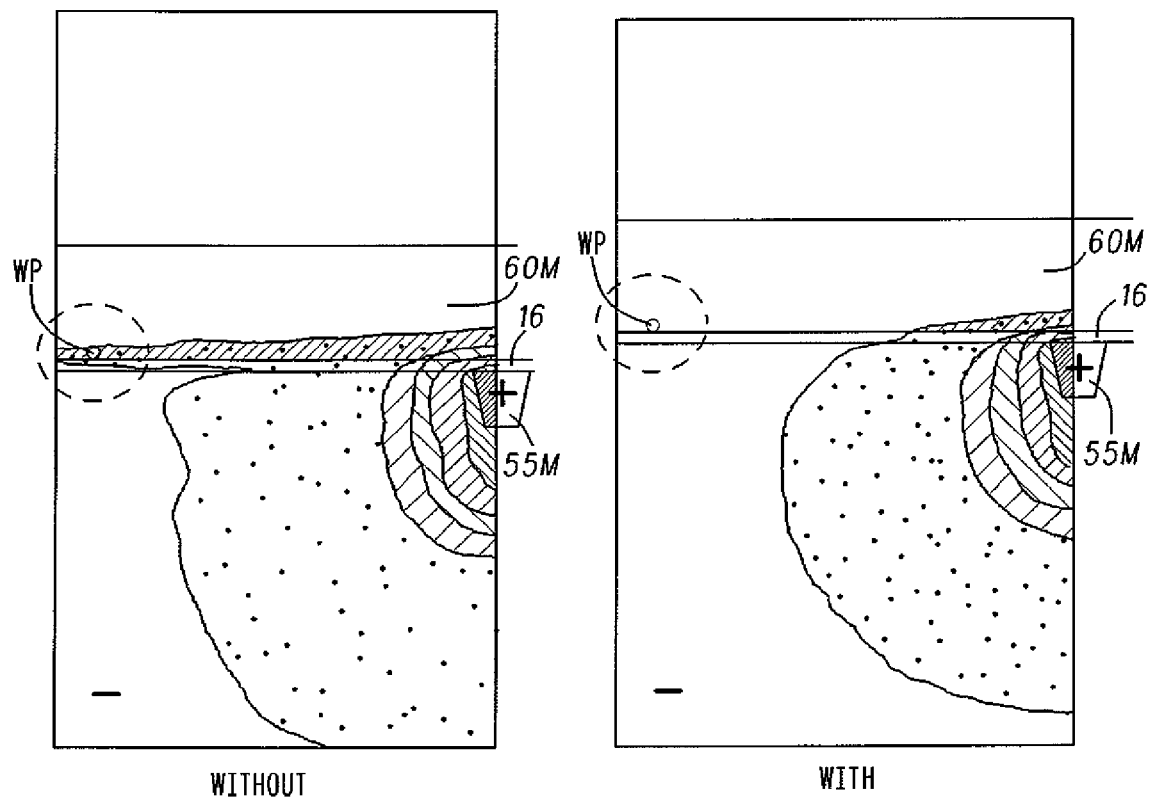
FIG. 15 shows magnetic flux strength (with/without the non-magnetic region)
Figure 16:
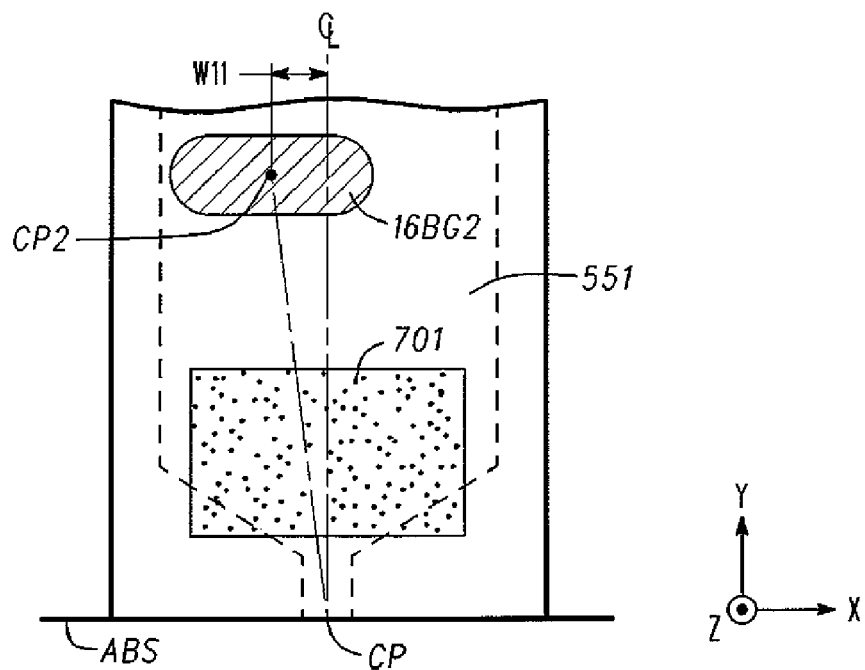
FIG. 16 is another top view showing a magnetic head according to a second embodiment.
Figure 17:
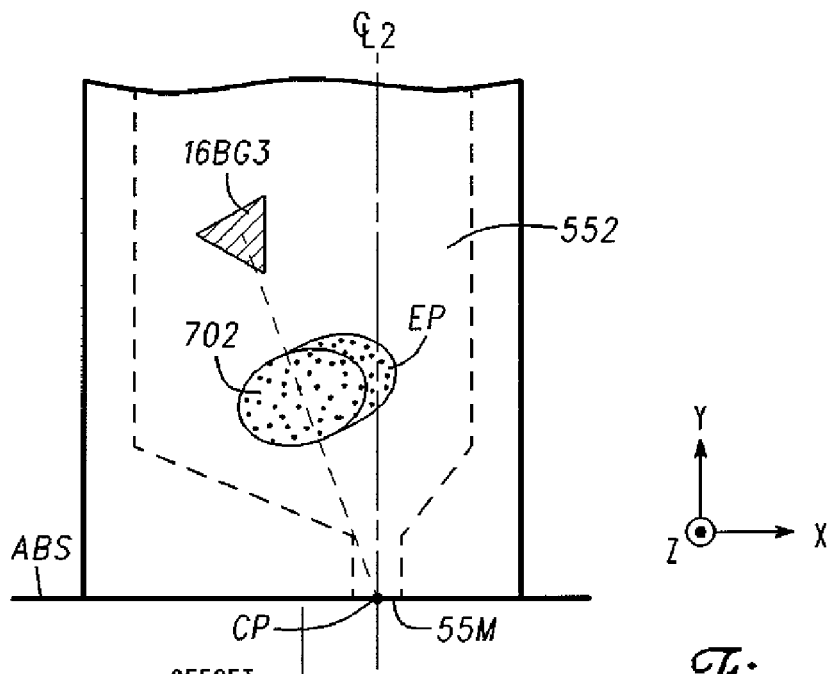
FIG. 17 is another top view showing a magnetic head according to third embodiment.

Features with respect to the non-magnetic region 700 will now be described. FIG. 8 shows main parts of the recording head on the ABS. A main magnetic pole layer 55 and its surface (magnetic pole surface 55M), and a surface (magnetic shield surface 60M) of the write shield layer 61 and the return yoke layer 63 (not shown in FIG. 8). FIG. 9 shows a schematic sectional view of the recording head 100B including the non-magnetic region 700 in view of X-direction. FIG. 10 is a top view showing the plan configuration of the magnetic recording head having the non-magnetic region 700 from the Z-direction. FIGS. 11 and 12 illustrate two types of a magnetic flux circulation pathway in case where the non-magnetic region 700 is present and not present. FIG. 13 shows another type of the non-magnetic region on which a modeling is conducted. FIGS. 14 and 15 show the result of the modeling. FIG. 14 shows a relation with shapes of the non-magnetic region 700 and the strength of the magnetic field. FIG. 15 shows a distribution of the magnetic intensity on the surface of the recording medium. FIGS. 16 and 17 are top views showing other embodiments.

(Non-Magnetic Region)

The non-magnetic region 700 is formed of non-magnetic material, for example, alumina, and is disposed in the magnetic shield layer 60. One embodiment of the region 700 is depicted in FIGS. 9 and 10. The region 700 is positioned at the trailing side from the main magnetic pole layer 55 (above the layer 55, or +Z direction) and sits in a recess formed in the magnetic shield layer 60. Further, the region 700 is disposed behind the ABS at a predetermined distance.

(Depth)

As shown in FIGS. 9 and 10, a distance from the ABS to the region 700 is defined depth D1. In the embodiment, the depth D1 is set larger than the throat height TH. Specifically, the depth D1 is 0.2 μm. A depth of the region 700 is defined a depth D7, and is specifically set 0.5 μm. A rear end of the region 700 positions in front of a boundary between the backgap 16BG and the insulating layer 19B. In the embodiment, an entire of the region 700 is disposed between the throat height position TP and the backgap 16BG. A distance from the rear end of the region 700 to the backgap 16BG is D3, the depth of backgap 16BG is D9. These proper amounts or portions with respect to these specifications (D1 to D9) can be arbitrarily determined considering the intensity of the magnetic field, or a shape of the region 700.

(Width)

FIG. 10 shows that width W7 of the region 700 is set smaller than the width W3 so that both sides of the region 700 are set inside/within both sides of the return yoke layer 63. The spaces between the region 700 and return yoke 63 function as a circulation way of the magnetic flux. The width W7 of the region 700 may be the same as the width W9 of the backgap 16BG, or can be larger than the width W9. For example, it is practical that the width W1 is 0.1 μm, the width W3 is 10 μm, and the width W9 is 3.5 μm.

(Height)

FIG. 9 shows that the region 700 is positioned in approximately the middle of the return yoke 63 in a manner of penetrating return yoke 63. A height H7 of the region 700 is the same as a height of the return yoke 63 (particularly, a parallel portion).

(Interrelation of Depth, Width and Height)

The Depth D, Width W and Height H can be arbitrarily set in various ranges in view of diffusing the magnetic flux which returns from the recording medium. Further, these proportions by these specifications (factors) also can be arbitrarily set. For example, a proportion by D1/W7 is preferably more than a proportion by TH/W9 because it might not be able to realize to adequately diffuse the magnetic flux in case where the proportion (D1/W7) is too large. On the other hand, if the proportion of D1/W7 is too small, the region 700 cannot effectively function to force the magnetic flux to go around the region 700. Consequently, the magnetic flux might easily become saturated near the ABS, further the magnetic flux might concentrate and form strong magnetic fields near sides of the magnetic shield layer 60 (or portions on the ABS corresponding to the both sides of the region 700). It is also practical that TH is 0.1 μm or more, and W9 is 3 μm or more. Further, it is practical to design a head of the region 700 (foremost side of 700) in the most effective shape by using a simulation method such as FEM.

(Locations of Non-Magnetic Region)

The region 700 is symmetrically arranged in the X-direction with respect to a center line CL. The center line CL is a vertical line in the Y-Z dimension from a center point CP of the trailing edge TE of the magnetic pole surface 55M. See FIGS. 8 and 10. With the configuration, it becomes possible to force the magnetic flux which returns the magnetic shield surface 60M to equally divide into two directions (right and left) and to go around the region 700. Further, in the embodiment shown FIG. 10, a center point BCP of the backgap 16GB is also set on the center line CL. A connecting line which links the middle of the trailing edge TE with the center point BCP is the same as the above center line CL. The connecting line is the shortest pathway for the magnetic flux which runs from the ABS to backgap 16BG. The invention blocks/closes the connecting line by the non-magnetic region 700 so that the magnetic flux is effectively forced to go around the region 700. Additionally, in one preferred embodiment, the region 700 is disposed in a seemingly straight portion in the return yoke layer 63, or in the region 700 in a manner parallel to the main magnetic pole layer 55 in the view of FIG. 9. However, it is also practical to dispose the region 700 in any curved portions.

(Basics of the Magnetic Flux Circulation)

The roles of non-magnetic region 700 are described here. In order to explain the background, a circulation of the magnetic flux is discussed first in case of the region 700 not existing (see FIG. 11). As discussed in FIG. 4B, the magnetic flux F which was emitted from the magnetic pole layer 50 toward the recording medium 80 returns the magnetic shield surface 60M after magnetizing the magnetizing layer 81 then passing through the soft magnetic layer 82. Although some amount of the magnetic flux F is diffused in the right and left directions (X-direction) while the flux F runs through the recording medium 80, most of magnetic flux F is returned proximately above the main magnetic pole layer 55 because the magnetic flux F is mostly generated and emitted at the main magnetic pole layer 55, and because a route from the main magnetic pole layer 55 to the backgap 16BG is the shortest way to reach the backgap 16 from the ABS. Further, the backgap 16BG causes a large magnetic field by itself so that the magnetic field generated by the backgap 16BG attracts the magnetic flux F in the direction to the backgap 16BG. Namely, there is a tendency in which most magnetic flux is corrected just above and proximately the main magnetic pole layer 55. FIG. 11 shows a large arrow F10 indicating a magnetic flux which was returned around the main magnetic pole layer 55 and directs to the backgap 16BG. Small arrows F20 and smaller arrows F30 which respectively indicate weak magnetic flux at the sides of the arrow F10, and at further sides. There is no obstacle between the surface 60M to the backgap 16BG, therefore, all magnetic flux indicated by the arrows F10, F20 and F30 run toward the backgap 16BG. And the direction with the arrow F10 is the busiest pathway to circulate the magnetic flux. After reaching backgap 16BG, the magnetic flux is to be supplied to the magnetic pole layer 50 via the backgap 16BG (see FIG. 4B for a magnetic circulation of F). The embodiment in FIG. 11 illustrates that the magnetic flux F are diffused in right and left directions to some degree. However, the diffused amount is small and most of magnetic flux F is returned around above main magnetic pole layer 55. Namely, it is said that the magnetic flux F can be easily concentrated above the main magnetic pole layer 55. (Refer to intensities of the magnetic field on the ABS, F10>>F20>F30)

(Magnetic Circulation with Non-Magnetic Field)

An embodiment of the invention disposes the non-magnetic region 700 in a part of the return yoke layer 63. FIG. 12 illustrates a circulation of magnetic flux F in a case where the region 700 is present. In FIG. 12, the region 700 is disposed between the ABS and backgap 16BG, its width W7 is set relatively smaller than the width W2 of the magnetic pole layer as well as the width of the magnetic shield layer.

Where the region 700 is present, the magnetic flux F collected at the periphery of the main magnetic pole layer 55 cannot reach the backgap 16BG straight. The flux has to avoid/dodge the region 700 before reaching the backgap 16BG. For example, the flux F is divided into two parts (See arrow F11 in FIG. 12). On the other hand, the region 700 is not a critical obstacle for the magnetic flux corrected outside of the main magnetic pole layer 55. This flux is combined with the above divided flux and run together toward the backgap 16BG.

Considering magnetic flux Fs (F10 and F11) returned at the main magnetic pole layer 55, the intensity of the magnetic flux F11 becomes smaller than that of the magnetic flux F10 due to the present of the region 700 (F10>F11). Contrary, an intensity of the magnetic flux F (F31) which is at outer sides of the flux F11 becomes larger than that of the flux F30 outside F10 (F30<F31). Importantly, the enlarged magnetic flux F31 is not strong enough to negatively affect the recording medium 80 so that the WATE can be avoidable. Put another way, the magnetic flux is properly diffused, and the total amount of magnetic flux circulating the recording magnetic head is maintained at a certain level.

Because of the diffusion of magnetic flux in the left and right directions, it becomes possible to reduce a maximum intensity of the magnetic flux F on the ABS, but to maintain the total amount of flux which is returned on the ABS. Consequently, it becomes possible to maintain strength of the writing magnetic field at the same level as that in case of the region 700 not existing.

(Forming Non-Magnetic Region)

In the process of the forming non-magnetic region 700, a designated fill area in the magnetic shield layer 60 has been formed so as not to be covered. In order to configure the designated fill area, conventional processes are available, such as lithographic, photoresist, and other masking processes, dry or wet etching (ion milling) process. Then, the designated area is filled with a non-magnetic material by a film forming technique, such as a sputtering method, resulting in forming the non-magnetic region 700. In this embodiment, the non-magnetic region 700 and the overcoat layer 21 are formed of non-magnetic material. It is possible to configure the region 700 and overcoat layer 21 with an identical material and by a continuous process. When an identical material is used, there is no physical boundary between the region 700 and overcoat layer 21. Similarly, there is no physical boundary between the region 700 and insulating layer 19B (see FIG. 2B). Considering this feature, the boundaries of the region 700 are drawn by dotted lines in FIG. 9.

(Result of Modeling/Calculation)

A result of modeling/calculation regarding effects of the non-magnetic region 700 is described here. FIG. 13 shows a sectional view of recording head 100B cut along the center line CL (see FIGS. 8 and 10) in the Y-Z dimension. At a lower left side, a cutting section is depicted. At a lower right side, the side is facing the ABS. The bottom layer of recording head 100B includes the main magnetic pole layer 55, and the lowest portion facing the right side is the magnetic pole surface 55M which emits a magnetic flux. For ease of understanding, the gap layer 16, coil 18B, and insulating layer 19B which are all positioned at the trailing side of the main magnetic pole layer 55 are not shown in the drawing. Above the main magnetic pole layer 55, write shield layer 61 and return yoke layer 63 are disposed. The return yoke layer 63 has an upside-down cup shape, and a straight portion is formed at the top, the straight portion being parallel to the main magnetic pole layer 55. Other portions of the return yoke layer 63 are curved portions. The region 700 is placed in the straight portion (see blocks I, II, and IV) and the curved portion of the return yoke layer 63 as well (see blocks III and V). Arrows F in FIG. 13 indicate flows of the magnetic flux going around the region 700. A most magnetic flux emitted from the magnetic pole surface 55M is returned at the write shield layer 61. After it is returned, the magnetic flux F moves to an upper right side to circumvent the region 700, then heads toward the backgap 16BG through a space between the region 700 and side edge E63 of the return yoke layer 63.

(Modeling Conditions and Specifications)

Conditions and specifications of the recording head 100B shown in FIG. 13 are below:

TABLE 1

Conditions for modeling, see FIG. 13

| | |
|---|---|
| D1 (depths from ABS to blocks III and V) | 1 μm |
| D71 (depths of blocks III and V) | 1 μm |
| D72 (depths of blocks I, II, IV) | 3 μm |
| D3 (depths from I, II, IV to backgap 16BG) | 1 μm |
| D9 (depth of backgap 16BG) | 1 μm |
| W11 (width of trailing edge TE, see FIG. 8) *note: defined from CL | 0.05 μm |
| W13 (width of block III) *note: Blocks I and II have the same width (1.75 μm), the width is half of a width of block III | 3.5 μm |
| W15 (width of block IV and V) | 6.5 μm |
| W17 (width from blocks IV and V to edge E63 of the magnetic shield layer 60) | 2 μm |
| W9 (width of backgap 16BG) See FIG. 10 | 3.5 μm |

The modeling was exercised with a single block or with several blocks together shown in FIG. 13. Combinations of the blocks are described below. Magnetic field intensity on the ABS for writing (recording) was determined at the center point CP of trailing edge TE (see FIG. 8). Magnetic field intensity on the ABS for reading was determined at point WP (WATE point, see FIG. 8), the point WP is on the bottom edge of the write shield layer 61 and is 1.0 μm (φ) far from the center line CL in the X-direction. The main magnetic pole layer 55 was formed of Fe—Co alloy of which a saturation magnetic flux density (Bs) is 24 T. Write shield layer 61 was formed of Fe—Co—Ni alloy of which a saturation magnetic flux density (Bs) is is 18 T. However, Permalloy was employed for the write shield layer 61 in comparison 2 (SHB was in comparison 1). Combinations of blocks, strength of writing magnetic field and strength of returning magnetic field are described below.

TABLE 2

Combinations of blocks, strengths of writing and returning magnetic fields

| | | Intensity of the magnetic field | |
|---|---|---|---|
| | Combinations | the writing field | the returning field |
| Comparison 1 (SHB) | Without block | 18152 | 740 |
| Comparison 2 (NiFe) | Without block and with Ni-Fe for the return yoke layer) | 17556 | 449 |

TABLE 2-continued

Combinations of blocks, strengths of writing and returning magnetic fields

| | Combinations | Intensity of the magnetic field | |
|---|---|---|---|
| | | the writing field | the returning field |
| Ex. 1 | Block I | 18175 | 653 |
| Ex. 2 | Blocks I + II | 18169 | 687 |
| Ex. 3 | Blocks I + II + III | 18178 | 659 |
| Ex. 4 | Blocks I + II + IV | 18063 | 317 |
| Ex. 5 | Blocks I + II + III + IV + V | 18043 | 378 |
| Ex. 6 | Block III | 18198 | 629 |

(Analysis of Modeling)

The modeling result is shown in FIG. 14. In FIG. 14, the above comparisons and combinations (Ex. 1 to Ex. 7) also are arranged along the horizontal line. The left vertical line means the intensity of the writing magnetic field (hereinafter write field strength WF). The right vertical line means the intensity of the returning magnetic field (hereinafter return field strength RF). In the drawing, the intensity for writing is indicated by mark ♦, the strength for returning is indicated by mark □.

Re: Comparison 1 (SHB)

The WF and RF both show large values (WF=18152 [Oe], RF=740 [Oe]). The large value of the WF is suitable, however, the large value of RF is not fine because it might cause so-called WATE (Wide Area Track Eraser) as discussed above.

Re: Comparison 2 (NiFe)

Compared with the comparison 1, the values of WF and RF both are lower. The small value of RF is suitable, but the small value of WF is not in view of increasing data density. The consequence happens due to the weaken magnetic coupling with the magnetic pole layer 50 and the return yolk layer 63 when NiFe is used for the return yoke layer 63, NiFe having a small value of saturation magnetic flux density.

Re: Ex. 1 to Ex. 3, and Ex. 6

The WFs of Ex. 1-3 and 6 all indicate approximately 18200 [Oe] (specifically from 18169 [Oe] to 18198 [Oe]). It can be estimated that the WFs of the examples are the same as that of the comparison 1. On the other hand, the values of RF are in a range of 629 [Oe] to 687 [Oe]. They are smaller by 7.2% to 15.6% than the value of comparison 1, 740 [Oe]. Therefore, these values show that weaken return magnetic fields have been realized.

Re: Ex. 4, Ex. 5, and Ex. 7

Further, the WFs of Ex. 4, 5, and 7 also indicate approximately 18200 [Oe] (specifically from 18043 [Oe] to 18114 [Oe]). It can be estimated that these are no significant changes in the values of WFs. On the other hand, the values of RF are in a range of 317 [Oe] to 361 [Oe]. They are smaller by 51.22% to 57.2% than the value of comparison 1. Therefore, these values show that further weakened return magnetic fields have been realized.

The results of the modeling show that it realizes to maintain the intensity of the writing field, but to reduce the intensity of the return field by placing the non-magnetic region 700 having a proper shape in a part of the return yoke layer 63. Especially, more effective configurations are above Ex. 4, 5, and 7. One common feature among these models is to have at least either block IV or V. Blocks IV or V are positioned at far side from the center line CL shown in FIG. 13. As numbers shown in Table I explain, Outer edge E4 of Block IV and edge E5 are positioned at outer side than backgap 16BG is. The outer edges E4 and E5 of these blocks are positioned inside outer edge E63 of return yoke layer 63.

(Explanation of Diffusion Map)

A schematic illustration of a diffused flux map is shown in FIG. 15. FIG. 15 illustrates a magnetic distribution on a surface of recording medium 80 which faces the magnetic pole surface 55M and magnetic shield surface 60M. The distributions of the magnetic flux are symmetric with respect to the Z direction in the X-direction. Therefore, only left halves of the distributions are shown. The left drawing shows a distribution derived from the comparison 1 which is without the region 700. The right drawing shows a distribution from Ex. 5 which is with the non-magnetic region 700 (including blocks I-V). Schematic shapes of the magnetic pole surface 55M, gap layer 16, and magnetic shield surface 60M are added. In FIG. 15, the magnetic pole surface 55M is at the right edge and the middle in the height. The gap layer 16 is shown above the surface 55M, and the surface 60M is further above gap layer 16. In addition, directions of magnetic flux are opposite in the writing field and return field. Therefore, absolute values of the magnetic strength are shown in FIG. 15. Dark portions indicate a strong magnetic flux, and light (pale) portions indicate a weak magnetic flux.

The left drawing shows that hatchings become pale as areas move outwardly (mainly downwardly) from the magnetic pole surface 55M. It means that magnetic flux emitted at the magnetic pole surface 55M gradually diffuses in a direction toward the recording medium. Meanwhile, near the bottom edge of the magnetic shield surface 60M which is at the trailing side of the magnetic pole surface 55M, there is a dark belt in the right-left direction (see the circle in the drawing). The belt indicates that there is a stronger magnetic field rather than its surroundings. The belt also indicates that the return magnetic field on the magnetic shield surface 60 is higher than its surroundings. As shown if FIG. 15, when a magnetic flux returns to the magnetic shield surface 60M, it has already been diffused to some degree. However, the dark belt means that it has not been diffused enough and is still partially concentrated on magnetic shield surface 60M. There are very pale or white areas in the upper magnetic shield surface 60M and other areas. These areas indicate weaker magnetic fields than their surroundings.

The right drawing illustrating the result of Ex. 5 shows a similar distribution near the magnetic pole surface 55M to the left drawing. It indicates that the non-magnetic region 700 does not affect the writing magnetic field significantly. On the other hand, there are many pale color areas in upper area from the magnetic pole surface 55M. It is analyzed that the magnetic fields at these areas were weakened. Namely, it should be estimated that the magnetic fields were diffused. Especially; there is not a dark portion within a circle indicating that a magnetic field circled by the line is practically at the same level as its surroundings are, and compared with the left drawing, that the intensity of the magnetic field at the area was significantly decreased by placing the non-magnetic region 700. Also, the WATE phenomena can be prevented.

Other Embodiments

Shapes, locations, and specifications with respect to the non-magnetic 700 can be arbitrarily set as long as the non-magnetic region 700 interrupts the shortest circulation pathway of the magnetic flux, and forces the flux to go around the region 700 so that the returning magnetic flux on the ABS can be enough diffused. Other embodiments are described hereafter.

Another Embodiment

Offset Backgap

FIG. 16 is a top view of the recording head 100B in the view from the trailing side, in the similar way to FIG. 12. There is the ABS at the lower side. The upper side shows a deep portion of the recording head 100B. In the embodiment, one feature is that the backgap 16BG2 is positioned not on a center line CL of a main magnetic pole layer 551, but at a left side (−X direction) from the center line CL (see width W11). On the other hand, the non-magnetic region 701 is symmetrically disposed against the center line CL. A shape of the region 700 from the top is a rectangle with a longer width. Further, in view of forcing a magnetic flux to go around, the region 701 is disposed in a certain area which include the shortest pathway (a connecting line) connecting the center point CP with a center point CP2 of the backgap 16BG2

It is an essential feature to evenly diffuse return magnetic flux, and to reduce the intensity of the flux. However, it is not restricted to symmetrically arrange the backgap and the non-magnetic region with respect to the center line in order to achieve the feature. The configuration recited in FIG. 16 is one example. Additionally, magnetic flux returning the ABS tends to evenly diffuse in right-left direction with respect to a position of the magnetic pole surface regardless of a position of the backgap. Considering the tendency, it is also practical to arrange the non-magnetic region at a symmetric position with respect to the center line of the magnetic pole surface no matter where the backgap is disposed.

Another Embodiment 2

Positional Relation with Magnetic Shield Surface

FIG. 17 is also a top view of the recording head 100B from the trailing side. In the drawing, there is the ABS at the lower side. The upper side shows a deep portion of the recording head 100B. A magnetic pole surface 55M of a main magnetic pole layer 552 is positioned at the right side from a middle of the main magnetic pole layer 552 in the embodiment (see "Offset" in FIG. 17), and the middle of the layer 552 is defined with respect to a width of the layer 552. Backgap 16BG3 is shaped as a triangle. The non-magnetic region 702 is shaped as an ellipse. Further, the ellipse has an eccentric shape, which is enlarged to one side. In FIG. 17, the eccentric portion is shown by hatching (see EP). Even with such a configuration, the invention can realize/help to force the magnetic flux to go around, and to diffuse the magnetic field.

Another Embodiment 3

Y-Z Sectional Shape of Non-Magnetic Region

With respect to a sectional shape of the non-magnetic region in view from the ABS (or X-Z dimension shown in FIG. 8), it is not necessary to limit a rectangular shape. As long as there is at least a portion which penetrates the magnetic shield layer and is able to block/intercept a main pathway of the magnetic circulation, the invention can be realized with various types of shapes of the non-magnetic region. For example, a rectangle with rounded corners, a triangle, or one with a wave shape on its surface are all practical. It is also not necessary to symmetrically assemble with respect to the center line CL or the connecting line.

(Design Freedom)

While the present invention has been described above with respect to various embodiments, the present invention is not so limited as different modifications may be made. Although the perpendicular magnetic recording head is applied to the composite type head, it may be applied to a recording dedicated head not equipped with a reading head. The applications to these cases also provide the same effect.

(Application to Other Devices)

Although in the foregoing embodiments, the magnetic device and the method of forming magnetic layer pattern are applied to the perpendicular magnetic recording head and the manufacturing method thereof, these may be applied to other different devices and manufacturing methods thereof. Examples of the different devices are thin film inductors, thin film sensors, thin film actuators, semiconductor devices, and devices equipped with these types of devices. The applications to these cases also provide the same effect.

Industrial Utility

The magnetic device and the method of forming a magnetic layer pattern are applicable to methods of manufacturing a perpendicular magnetic recording head, a magnetic recording system, and a perpendicular magnetic recording head.

What is claimed:

1. A perpendicular magnetic head for writing information on a magnetic recording medium, comprising:
   an air bearing surface (ABS) facing toward the magnetic recording medium;
   a coil for generating a magnetic flux corresponding to the information to be written on the magnetic recording medium, the coil being buried in an insulating material;
   a magnetic pole layer having a magnetic pole surface disposed at the ABS, the magnetic pole layer permitting the magnetic flux generated by the coil to pass therethrough, and generating a magnetic field for writing the information on the magnetic recording medium;
   a magnetic shield layer having a magnetic shield surface disposed at the ABS, the magnetic shield layer connected to the magnetic pole layer at a position displaced from the ABS, the magnetic shield layer collecting the magnetic flux generated by the magnetic pole layer and returning the magnetic flux to the magnetic pole layer through a backgap;
   a gap layer made of a non-magnetic material and disposed between the magnetic pole layer and the magnetic shield layer; and
   a non-magnetic region formed of a non-magnetic material and disposed in the magnetic shield layer, the non-magnetic region being positioned behind the ABS with a certain distance rearwardly from the ABS, being disposed on a connecting line which connects the magnetic pole surface with the backgap so as to penetrate the magnetic shield layer to reach the insulating material burying the coil in a direction along which the magnetic recording medium travels, and having a determined width and depth, the determined width being less than a width of the magnetic shield layer to define respective magnetic flux side pathways.

2. A magnetic recording system comprising:
a magnetic recording medium, and
a perpendicular magnetic recording head for writing information on the magnetic recording medium which includes:
a coil for generating a magnetic flux corresponding to information to be written on the magnetic recording medium, the coil being buried in an insulating material;
a magnetic pole layer emitting a magnetic flux toward the magnetic recording medium;
a magnetic shield layer collecting the magnetic flux emitted from the magnetic pole layer, the magnetic shield layer disposed at a trailing side of the magnetic pole layer with a certain space on an air bearing surface (ABS); and
a non-magnetic region displaced in the magnetic shield layer and behind the ABS with a certain distance, and having a predetermined width and depth so as to penetrate the magnetic shield layer to reach the insulating material burying the coil, wherein the width of the non-magnetic region is less than a width of the magnetic shield layer to define respective magnetic flux side pathways that are positioned to redirect the magnetic flux around the non-magnetic region in a width direction.

3. The magnetic recording system according to claim 2, wherein
the recording medium includes a magnetization layer disposed on a side close to the perpendicular magnetic recording head and soft magnetic layer disposed on a side far from the perpendicular magnetic recording head.

4. The perpendicular magnetic head for writing information of claim 1, wherein
the non-magnetic region is disposed to define respective magnetic flux side pathways that are positioned to redirect the magnetic flux around the non-magnetic region in a width direction as the magnetic flux returns to the backgap from the ABS.

5. A thin film magnetic head including the perpendicular magnetic head for writing information of claim 1, and further comprising:
a magneto resistive element (MR element) disposed separate from the perpendicular magnetic head, and
an insulating layer formed of a non-magnetic insulating material, wherein
the MR element of which a resistance value changes in response to a signal magnetic field from the magnetic recording medium so that the information written in the magnetic recording medium is read by detecting the resistance value changes,
the perpendicular magnetic head and the MR element are distinguished by the insulating layer, and
the magnetic pole layer is positioned between the magnetic shield layer with the non-magnetic region and the MR element.

6. The perpendicular magnetic head for writing information of claim 1, wherein
a width of the magnetic shield surface is approximately 100 times or more as large as a width of the magnetic pole surface.

7. The perpendicular magnetic head for writing information of claim 1, wherein
a width of the non-magnetic region is larger than a width of the backgap.

8. The perpendicular magnetic head for writing information of claim 1, wherein
the non-magnetic region has a representative width which is not smaller than a width of the backgap.

9. The perpendicular magnetic head for writing information of claim 1, wherein
the non-magnetic region is disposed in the magnetic shield layer deeper than a throat height.

10. The perpendicular magnetic head for writing information of claim 1, wherein
in a direction parallel to the ABS, a front end of the non-magnetic region is disposed behind a boundary between an internal end of the magnetic shield layer and a front end of the insulating material burying the coil, and disposed in front of a boundary between the backgap and the insulating material.

11. The perpendicular magnetic head for writing information of claim 10, wherein
the non-magnetic region is disposed in a parallel area of the magnetic shield layer, the parallel area being aligned in parallel with the magnetic pole layer in the X-Y dimension.

12. The perpendicular magnetic head for writing information of claim 1, wherein
the non-magnetic region is disposed in the magnetic shield layer behind a throat height and in front of the backgap.

13. The perpendicular magnetic head for writing information of claim 1, wherein
the non-magnetic region has a representative width that is 10-100 times as large as a representative depth to the non-magnetic region from the ABS.

14. The perpendicular magnetic head for writing information of claim 1, wherein
the non-magnetic region is formed in a material having a saturation magnetic flux density within a range of 1.5 T to 2.4 T.

* * * * *